(12) United States Patent
Kanada

(10) Patent No.: US 7,197,126 B2
(45) Date of Patent: Mar. 27, 2007

(54) HUMAN COMMUNICATION SYSTEM

(75) Inventor: Yasushi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 10/697,553

(22) Filed: Oct. 31, 2003

(65) Prior Publication Data

US 2004/0240652 A1 Dec. 2, 2004

(30) Foreign Application Priority Data

May 26, 2003 (JP) ............... 2003-147801

(51) Int. Cl.
*H04M 3/42* (2006.01)
*G06F 15/16* (2006.01)
(52) U.S. Cl. ............... 379/202.01; 379/201.1; 709/204
(58) Field of Classification Search ............... 379/201.01–201.06, 201.1, 207.01, 202.01–206.01; 348/14.08; 381/1, 26; 709/204; 370/260, 370/270
See application file for complete search history.

(56) References Cited

U.S. PATENT DOCUMENTS 5,889,843 A 3/1999 Singer et al.
6,262,711 B1 7/2001 Cohen et al.
6,577,306 B2 * 6/2003 Matsuda .................. 345/419
6,850,496 B1 * 2/2005 Knappe et al. ............ 370/260

OTHER PUBLICATIONS

Colin Lowe and Laurent Babarit., "Distributed 3D audio rendering." HP Labs., http://www7.scu.edu.au/programme/fullpapers/1912 Jul. 25, 2003 pp. 1-9.
A. Singer et al., "Tangible Progress: Less Is More In Somewire Audio Spaces." Papers CHI May 15-20, 1999. pp. 104-111 & 625.
Hideyuki Nakanishi, et al. "FreeWalk: A 3D Virtual Space for Casual Meetings", Apr.-Jun. 1999 IEEE.
Hideyuki Nakanishi, et al. "FreeWalk: Supporting Informal Communication in a Three Dimentional Virtual Space", IPSJ Journal, vol. 39, No. 5, pp. 1356-1364, May 1998.

* cited by examiner

*Primary Examiner*—Benny Quoc Tieu
(74) *Attorney, Agent, or Firm*—McDermott Will & Emery LLP

(57) ABSTRACT

A client terminal 201 comprises a presence provider 222 which sends information on a user's location to a presence server 110, a space modeling means 221 which calculates the user's location in a virtual space, an audio renderer 216 which controls sound effects based on the user's location in the virtual space, a graphics renderer 219 which generates image data based on the user's location in the virtual space, and a policy session control unit 223 which controls a communication session, to realize conversations between a plurality of users utilizing the virtual space.

18 Claims, 14 Drawing Sheets

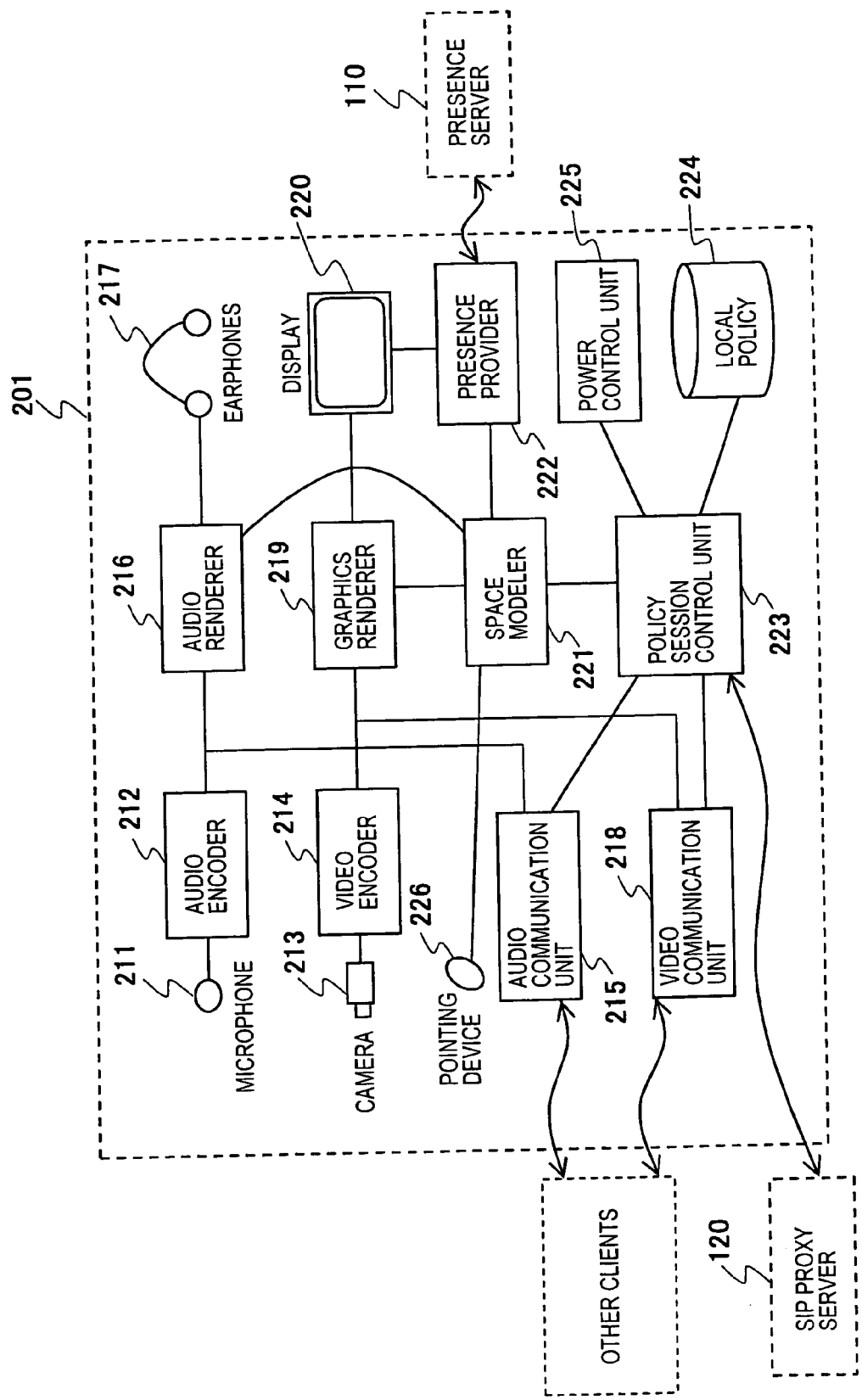

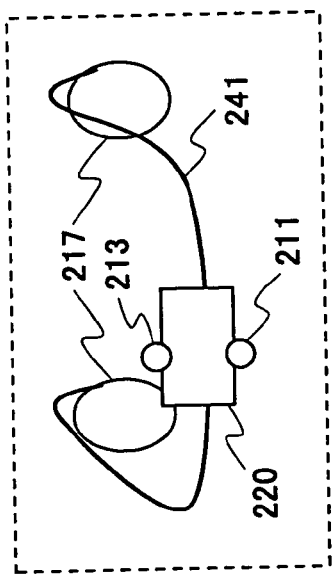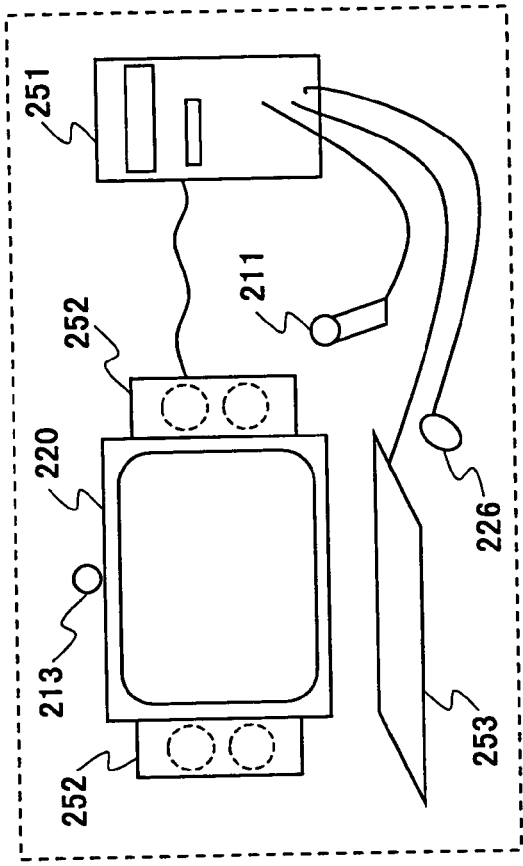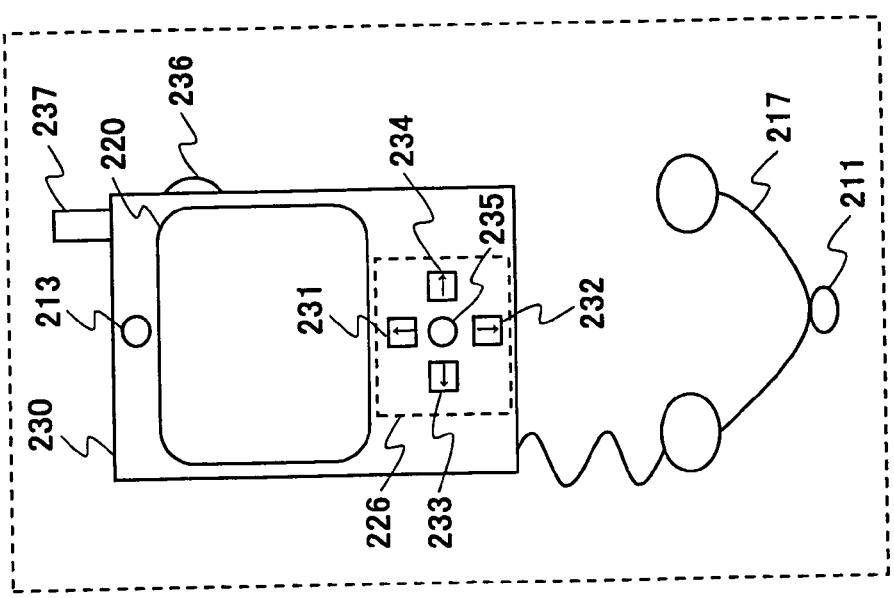

FIG.13

```
if (distance(RemoteSite) > 50) {            ~1311
    disconnect;
} if (distance(RemoteSite) <= 50) {           ~1312
    connect;
} if (distance(RemoteSite) <= 10 &&           ~1313
    intimate(RemoteSite)) {
    video.quality = clear;
    audio.quality = clear;
} if (distance(RemoteSite) <= 10 &&           ~1314
    ! intimate(RemoteSite)) {
    video.quality = unclear;
    audio.quality = clear;
} if (distance(RemoteSite) > 10) {            ~1315
    video.quality = unclear;
    audio.quality = unrecognizable;
}
```

224

HUMAN COMMUNICATION SYSTEM

BACKGROUND OF THE INVENTION

The present invention relates to a communication terminal and a communication server used for people to talk with one another mainly in voice through a medium.

A first conventional technique relating to the present invention is FreeWalk, which is a conference system developed by Kyoto University. See, for example, NAKANISHI, Hideyuki, YOSHIDA, Chikara, NISHIMURA, Toshikazu, and ISHIDA, Toru, "FreeWalk: Support of Non-formal Communication Using Three-dimensional Virtual Space", IPSJ Journal, Vol. 39, No. 5, pp. 1356–1364, 1998 (hereinafter, referred to as Non-patent Documents 1) and Nakanishi, H., Yoshida, C., Nishimura, T., and Ishida, T., "FreeWalk: A 3D Virtual Space for Casual Meetings", IEEE MultiMedia, April–June 1999, pp. 2028 (hereinafter, referred to as Non-patent Documents 2). FreeWalk is a system in which users of the conference system share a virtual space and users in the same space can talk with one another. Each user can see this virtual space by three-dimensional graphics, as an image seen from his viewpoint or from a viewpoint that is near to his viewpoint but able to see himself within the range of vision. Three-dimensional graphics is a technique for simulating a three-dimensional space by computer graphics, and, for example, OpenGL (http://www.opengl.org/), which is de facto standard, and Direct 3D of Microsoft Corporation are APIs (Application Programming Interface) for achieving that end. An image of a conversational partner is shot by a video camera and projected in real time on a virtual screen located in the image seen from, for example, the user's viewpoint. Further, each user can move free in this virtual space. Namely, each user can change his location in this virtual space, using a pointing device or keys of a keyboard. In Non-patent documents 1 and 2, voice is damped as distance increases, but those documents do not mention the below-mentioned three-dimensional audio technique.

A second conventional technique relating to the present invention is Somewire, which is a conference system developed by Interval Research Corporation. See, for example, U.S. Pat. No. 5,889,843 (hereinafter, referred to as Patent Documents 1), U.S. Pat. No. 6,262,711 B1 (hereinafter, referred to as Patent Documents 2), and Singer, A., Hindus, D., Stifelman, L., and White, S., "Tangible Progress: Less Is More In Somewire Audio Spaces", ACM CHI '99 (Conference on Human Factors in Computing Systems), pp. 104 to 112, May 1999 (hereinafter, referred to as Non-patent Document 3). Somewire is a system in which users of the conference system share a virtual system and users in the same space can talk with one another. In Somewire, voice is reproduced by high quality stereo audio. Further, Somewire has an intuitive tangible interface, since it employs GUI (Graphical User Interface) that can control a location of a conversational partner in the virtual space by moving a doll-like figure. In Somewire, voice is not damped as distance increases, and the three-dimensional audio technique is not employed.

A third conventional technique relating to the present invention is a conference system using the distributed 3D audio technique developed by Hewlett-Packard Company. See, for example, Low, C. and Babarit, L., "Distributed 3D Audio Rendering", 7th International World Wide Web Conference (WWW7), 1998, http://www7.scu.edu.au/programme/fullpapers/1912/com1912.htm (hereinafter, referred to as Non-patent Document 4). The distributed 3D audio technique is a technique that applies the three-dimensional audio technique to a networked system (so-called distributed environment). The three-dimensional audio technique is a technique of simulating a three-dimensional acoustic space, and, for example, Open AL (http://www.opengl.org/) prescribed by Loki Entertainment Software Inc. and others and DirectSound 3D of Microsoft Corporation, EAX2.0 (http://www.sei.com/algorithms/eax20.pdf) of Creative Technology, Ltd. are mentioned as API for achieving that end. Using the three-dimensional audio technique, it is possible to simulate a direction and distance of a sound source seen from a listener, in sound reproduction using speakers such as headphones or 2- or 4-channel speakers, and to locate the sound source in an acoustic space. Further, by simulating acoustic properties such as reverberation, reflection by an object such as a wall, sound absorption by air depending on distance, sound interception by an obstacle, and the like, it is possible to express an impression of existence of a room and an impression of existence of an object in a space. The three-dimensional audio technique is one of stereo phone reproduction systems. In addition to the three-dimensional audio technique, stereo phone reproduction systems include simple stereo phone reproduction techniques. For example, may be mentioned a stereo phone reproduction technique that differentiates sound volumes between left and right speakers in headphones to reproduce a plurality of sounds separately.

SUMMARY OF THE INVENTION

The above-mentioned conventional techniques each employ a conference system that is an always-connected system utilizing an IP network and that enables talks between many people.

However, in the case of an always-connected conference system, it is desired that a virtual space itself and presence (i.e., impression of existence) of users and objects in the virtual space are made consistent between the users. In detail, when a virtual space is a room having a ceiling and wall surfaces, the room has properties such as area and reverberation properties, and users should share values of such properties that determine the impression of existence of the room. Properties, particularly, reverberation properties, of a virtual space contribute to determination of user's perception of distance in the virtual space. Accordingly, it is very important for the users to share the properties of the virtual space. Further, a first user's location recognized by the first user himself in the virtual space and a first user's location recognized by a second user should be made consistent between the first and second users. Such consistency should be established between all the users.

Further, in the case of an always-connected conference system, it is desired to reduce consumption of network resources such as traffic between users and terminal resources such as batteries. In an always-connected conference system, continuous transmission of a large number of packets all during the connection congests the network unnecessarily. When the network bandwidth is broadened to settle network congestion, communication costs become very expensive. Further, in the case where a portable terminal is used as a terminal of the system, it is favorable that the portable terminal can operate on a battery at least one day without being charged. However, when a communication module or a CPU operates at the maximum speed, the battery is consumed largely, and it is difficult to keep the battery alive one day. A technique of stopping packet transmission at the time of silence has been developed already.

However, in this technique, whether a signal is to be transmitted or not is judged based on signal characteristics only. Accordingly, there is a problem that, when a threshold is lowered to promote distribution of tacit knowledge, traffic is not reduced much, and when a threshold is raised, distribution of the tacit knowledge is prevented. Here, the tacit knowledge means information and knowledge (such as know-how and how-to of a job) that can not be expressed by characters, words and numerals and is hard to transmit.

Further, in an always-connected conference system, protection of privacy is desired. In the conference systems listed as the conventional techniques, any user existing in one virtual space can hear conversation of the other users at any time. Thus, in this case, it is impossible to realize privacy protection on the same level as one-to-one conversation on the telephone or the like.

The present invention provides a user-friendly human communication system that can make users' presence consistent with one another and protect privacy.

A human communication system according to the present invention comprises a plurality of client terminals and a server apparatus, and each client terminal sends information of a location of the user of the client terminal to the server, and the server manages and stores, in a centralized manner, the information on the location of each user in a virtual space.

As a result, it is possible to keep presence (impressions of existence) of each user consistent between the users in the virtual space. Further, each client terminal controls a communication session with another client terminal, and as a result, resource consumption can be reduced and privacy can be protected.

For example, the present invention provides a human communication system using a virtual space for realizing conversations between a plurality of users, comprising a server apparatus which manages respective locations of the mentioned plurality of users in the virtual space, and a plurality of client terminals used respectively by the mentioned plurality of users. Each of the plurality of client terminals comprises: a client sending means which sends information on a location of a user himself of the client terminal in question to the server apparatus; a client receiving means which receives information on respective locations of the other users than the user of the client terminal in question from the server apparatus; a space modeling means which calculates respective locations of the plurality of users based on the information on the user of the client terminal in question and the information on the locations of the other users; and a sound control means which controls sound effects applied to respective voices of the other users based on the locations calculated by the space modeling means. The server apparatus comprises: a server receiving means which receives, from each of the plurality of client terminals, the information on the location of the user of the client terminal in question; a storage mans which stores the respective locations of the plurality of users in the virtual space, based on the received information; and a server sending means which sends, to each of the plurality of client terminals, the information on the locations of the other users than the user of the client terminal in question.

Further, the present invention provides a human communication system using a virtual space for realizing conversations between a plurality of users, comprising a plurality of client terminals used respectively by the plurality of users. Each of the plurality of client terminals comprises a policy session control means which controls a communication session and a local policy storage means which stores communication conditions. When a user of a client terminal communicate with a client terminal of the other user than the client terminal in question, the policy session control means of the client terminal in question refers to the local policy storage means of the client terminal in question to judge whether the other user comply with the communication conditions, and when the communication conditions are complied with, sends a communication request with designation of the communication conditions to policy session control means of the client terminals of user the other user. Each of the policy session control means of the client terminal of the other user refers to the local policy storage means of its client terminal to judge whether that client terminal complies with the designated communication conditions, and when the conditions are complied with, sends a communication permission to the policy session control means that has sent the communication request, and when the conditions are not complied with, sends a communication rejection to the policy session control means that has sent the communication request.

As described above, according to the present invention, a virtual space, users' locations in the virtual space, and presence such as impressions of existence are made consistent between the users, and, as a result, the users can have natural conversations in the virtual space. Further, each client holds policy rules of communication to control communication, consumption of resources such as electric cells, the network bandwidth, and the like can be reduced and privacy can be protected.

BRIEF DESCRIPTION OF THE DRAWINGS

FIG. 2 is a block diagram showing a client in an embodiment of the present invention;

FIGS. 3A, 3B and 3C show types of clients by way of examples in an embodiment of the present invention;

FIG. 13 shows an example of local policy in an embodiment of the present invention.

DETAILED DESCRIPTION

Now, embodiments of the present invention will be described.

Figure 1:
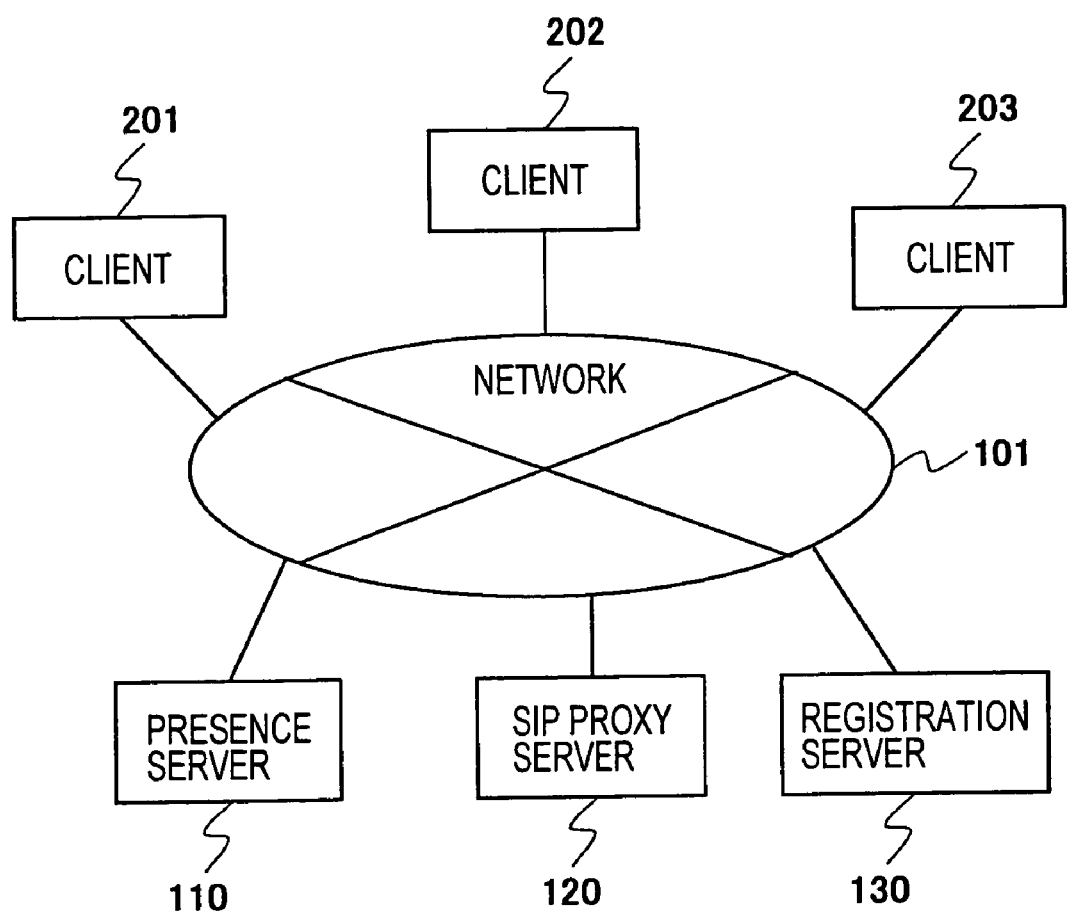
FIG. 1 is a block diagram showing a network configuration of an embodiment of the present invention.

FIG. 1 is a system configuration of a human communication system in an embodiment of the present invention. As shown in the figure, the present system comprises a plurality of clients 201, 202 and 203, a presence server 110 which manages presence, an SIP proxy server 120 which controls sessions, and a registration server 130 which registers and authenticating users, being connected with one another through a network 101 such as Internet. Although the present embodiment includes three clients, the number of clients is not limited to three. Two, four or more clients may be included. Further, in the present embodiment, the network 101 consists of single domain. However, it is possible that the network consists of a plurality of domains, and the domains are connected with one another to enable communication extending over a plurality of domains. In that case, there exist a plurality of presence servers 110, a plurality of SIP proxy servers 120, and a plurality of registration servers 130. In the present embodiment, a domain name "servers.com" is used for the above-mentioned single domain.

Next, will be described a hardware configuration of the human communication system.

Figure 14:
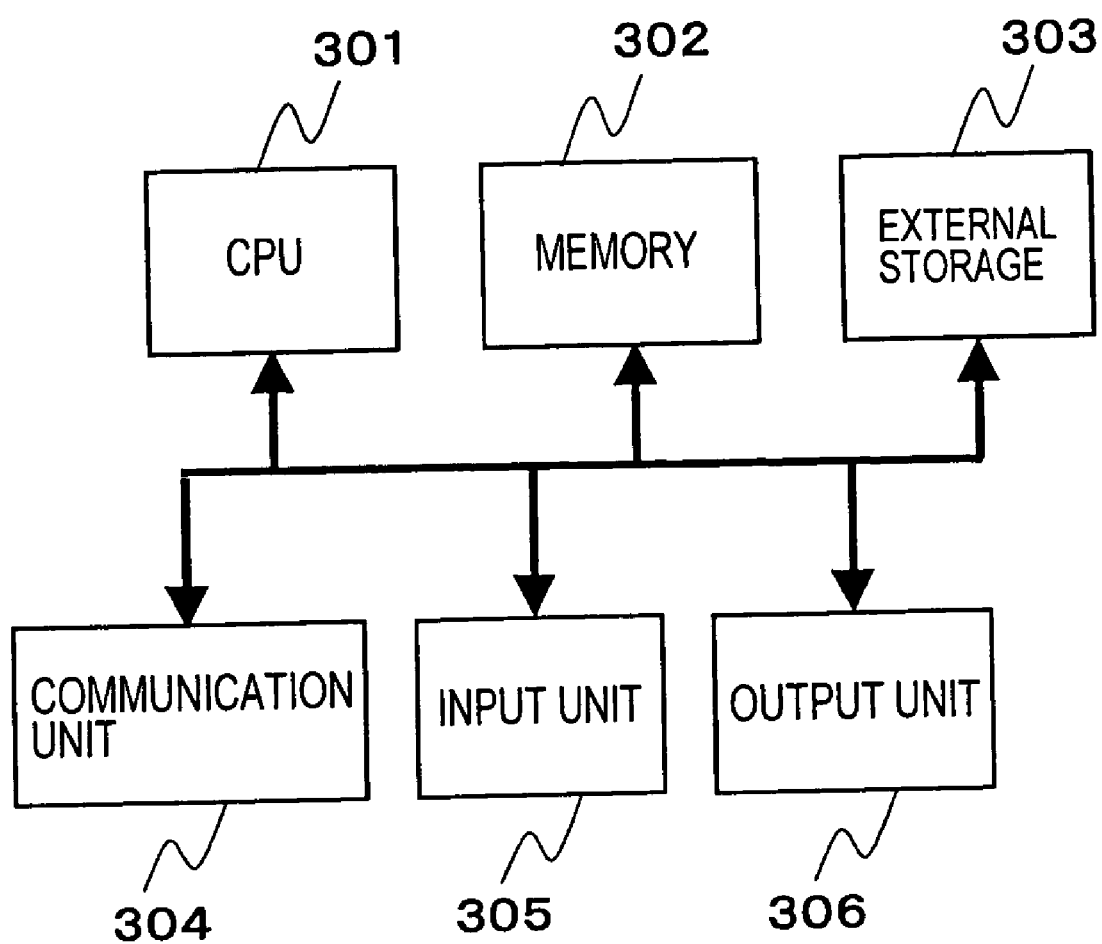
FIG. 14 is a block diagram showing a hardware configuration of each apparatus in an embodiment of the present invention.

FIG. 14 shows a hardware configuration for each of the clients 201, 202 and 203, the presence server 110, the SIP proxy server 120 and the registration server 130.

Each of the clients 201, 202 and 203 can be implemented by an ordinary computer system comprising a CPU 301 which executes data processing and calculation according to a program, a memory 302 from which the CPU 301 can directly read and write, an external storage 303 such as a hard disk, a communication unit 304 which communicates data with an external system, an input unit 305 such as a keyboard or a mouse, and an output unit 306 such as a display or a printer. For example, PDA (Personal Digital Assistant), PC (Personal Computer), or a wearable computer may be mentioned. Examples of clients will be described later referring to FIGS. 3A, 3B and 3C. Further, the input unit 305 and the output unit 306 will be described in detail, referring to FIG. 2.

Each of the presence server 110, the SIP proxy server 120 and the registration server 130 can be implemented by an ordinary computer comprising a CPU 301 which executes data processing and calculation according to a program, a memory 302 from which the CPU 301 can directly read and write, an external storage 303 such as a hard disk, and a communication unit 304 which communicates data with an external system. For example, a server or a host computer may be mentioned.

The below-mentioned functions of the above-mentioned apparatuses will be each realized when the CPU 301 executes a certain program (in the case of the client 201, 202 or 203, a program for a client; in the case of the presence server 110, a program for the presence server; in the case of the SIP proxy server 120, a program for the proxy server; and in the case of the registration server 130, a program for the registration server).

The above-mentioned programs each may be stored in the memory 302 or the external storage 303 in advance, or may be installed into the memory 302 or the external storage 303 using a storage medium such as a memory card, a flexible disk or a CD-ROM and a reader (not shown) of the medium, or using the network 101 as a communication medium connected to another apparatus, or using the communication unit 304 and a carrier wave transmitted through the network 101, depending on necessity.

Next, referring to FIG. 2, will be described the input unit 305 and the output unit 306 of the client 201 and a functional components of the client 201. The clients 202 and 203 have similar configurations.

As the input unit 305, the client 201 has a microphone 211, a camera 213 and a pointing device 226. As the output unit 306, the client 201 has earphones 217 and a display 220. The pointing device 226 is an input unit for a user to input his own movement information in a virtual space, and, for example, a mouse or a keyboard may be mentioned.

As the functional components, the client 201 comprises: an audio encoder 212 which converts voice into a digital signal; an audio renderer 216 which performs processing (such as reverberation and filtering) resulting from properties of a virtual space, using the three-dimensional audio technique; an video encoder 214 which converts an image into a digital signal; a graphics renderer 219 which performs processing (such as lighting) resulting from the properties of the virtual space, using a three-dimensional graphics technique; an input space modeler 221 which calculates presence such as an existence and its location in the virtual space, based on movement information inputted; a presence provider 222 which communicates information on the above-mentioned presence; an audio communication unit 215 which sends and receiving an audio signal in real time to and from another client; a video communication unit 218 which sends and receiving a video signal in real time to and from another client; a policy session control unit 223 which controls a communication session and which manages a policy; a local policy 224 which holds a policy of this client; and a power control unit 225 which reduces power consumption to prevent wasteful consumption of a battery.

Here, the virtual space is a virtually-created space for conference or conversation of a plurality of users, and is managed by the presence server 110. When a user enters a certain virtual space, the presence server 110 sends information on the properties of the virtual space and on the other users and objects existing in the virtual space. The space modeler 221 stores the information and the location of the user himself in the virtual space into the memory 302 or the external storage 303. The properties of the virtual space include the size of the space, the height of the ceiling, the reflectance ratios/colors/textures of the walls and the ceiling, the reverberation properties, and the sound absorption rate owing to air in the space, for example. Among them, the reflectance ratios of the walls and the ceiling, the reverberation properties and the sound absorption rate owing to air in the space are auditory properties, the colors and textures of the walls and the ceiling are visual properties, and the size of the space and the height of the ceiling are both auditory and visual properties. As an object in the virtual space, a screen may be mentioned, for example.

Next, operation of each function will be described in the order of voice, image, presence and session control.

As for voice, the microphone 211 collects voice of the user of the client 201 and ambient voice, and sends the collected voices to the audio encoder 212. The audio encoder 212 converts the received voices into a digital signal and outputs the signal to the audio renderer 216. Further, the audio communication unit 215 sends and receives an audio signal in real time to and from one or a plurality of other clients, and outputs the audio signal to the audio renderer 216.

Next, the audio renderer 216 receives digital output signals outputted from the audio encoder 212 and the audio communication unit 215. Then, using the three-dimensional audio technique, the audio renderer 216 calculates how voices of communication partners are heard in the virtual space, based on the auditory properties of the virtual space, the locations of the communication partners and the user himself in the virtual space. Those properties and the locations are held by the space modeler 221. Next, the audio renderer 216 performs the following processing on the voices outputted from the audio communication unit 215, i.e., the voices of the users as the communication partners, to control sound effects to obtain the sound heard at the location of the user of the client 201 in the virtual space. The processing includes control of sound volume based on the above-mentioned calculation, superposition of reverberation and an echo, filtering, and damping of sound due to a screen, for example. Namely, performing the processing resulting from the properties of the virtual space and the relative locations of the communication partners, the voices are oriented and reproduced.

Further, the audio renderer 216 performs, if necessary, the following processing on the output from the audio encoder 212. Namely, the processing resulting from the properties of the virtual space, such as reverberation and filtering, is performed. Then, the audio renderer 216 makes rendering at the location of the head of the user of the client 201. The voice generated by the audio renderer 216 is outputted to the earphones 217, and heard by the user.

As for image, the camera 213 shoots a head portion of the user, and the shot images are successively sent to the video encoder 214. Then, the video encoder 214 converts the images into a digital signal and output the signal to the graphics renderer 219. Further, the video communication unit 218 sends and receives a video signal in real time to and from one or a plurality of other clients, and outputs the video signal to the graphics renderer 219. Next, the graphics renderer 219 receives digital output signals from the video encoder 214 and the video communication unit 218. Then, using a three-dimensional graphics technique, the graphics renderer 219 calculates (coordinate transformation) how communication partners are seen in the virtual space, based on the visual properties of the virtual space, the locations of the communication partners and the user himself in the virtual space. Those properties and the locations are held by the space modeler 221. Next, with respect to the communication partners' images outputted from the video communication unit 218, the graphics renderer 219 erases the parts that should be hidden and not be seen from the viewpoint of the location of the user himself, based on the above-mentioned calculation. Further, the graphics renderer 219 performs processing resulting from the properties of the virtual space, such as shading due to the lighting in the virtual space, to generate image data to be outputted onto a display screen.

The image generated by the graphics renderer 219 is outputted to the display 220 and reproduced as an image seen from the viewpoint of the user of the client 201. The user refers to the output of the display 220 at need. The graphics renderer 219 may make simpler virtual space display without using a three-dimensional graphics technique.

The client 201 is an apparatus used mainly for voice communication, and the microphone 211 is an indispensable device, while the camera 213 is not necessary. In the case where the camera 213 does not exist, also the video encoder 214 etc. are useless.

For real time voice or image communication, RTP (Real-time Transport Protocol) is used. RTP is a protocol described in the document RFC 1889 issued by IETF (Internet Engineering Task Force). When delay increase is allowable to some degree in voice or image communication, then, a communication proxy server for voice or image communication may be provided additionally. The audio communication unit 215 or the video communication unit 218 may communicate voice or image with another client through the communication proxy server.

Next, as for presence, the pointing device 226 receives input of positional information or displacement information from the user, and converts the inputted information into a digital signal, to input into the space modeler 221. The space modeler 221 holds properties of the virtual space (such as the size of the space and reverberation properties) and the locations of the users in the virtual space. Those properties and the locations are sent in advance from the presence server 110. According to input from the pointing device 226, the space modeler 221 changes the above-mentioned locations and directions of the users in the virtual space. In detail, when a forward movement signal is received from the pointing device 226, then, the location of the user in the virtual space is moved forward, and when a backward movement signal is received, then, the location of the user in the virtual space is moved back. Further, when a leftward movement signal is received from the pointing device 226, then, the direction is turned left, and when a rightward movement signal is received, then, the direction is turned right. When a mouse is used as the pointing device 226, the above-mentioned changes can be inputted, for example, by drag operations of a forward movement, a backward movement, a leftward movement and a rightward movement in a state that the left button is pushed.

The space modeler 221 sends the positional information of the user of the client 201 in the virtual space to the presence provider 222, and the presence provider 222 sends the information to the presence server 110. Further, the presence provider 222 receives the positional information of the other users in the virtual space from the presence server 110, and delivers the information to the space modeler 221. The space modeler 221 holds the positional information of the user of the client 201 in the virtual space and the positional information of the other users in the virtual space. Since the space modeler 221 receives the positional information of the other users in the virtual space through the network 101, occurrence of delay and jitter can not be avoided with respect to the positional information of the other users. On the other hand, the positional information of the user himself is received from the pointing device 226 without through the network 101, and delay hardly occurs. Thus, the user of the client 201 can confirm the location of himself in real time on the display 220, and thus the pointing device 226 can be operated easily.

Next, session control will be described. The policy session control unit 223 communicates with the policy session control units of other clients through the SIP proxy server 120, to control communication of the audio communication unit 215 and the video communication unit 218.

The policy session control unit 223 refers to the local policy 224 stored in the external storage 303 of the client 201 and refers to a distance (which is held by the space modeler 221) of a communication partner in the virtual space, and judges whether to establish connection with the client of the communication partner, and judges quality of voice or image in the case of connection, to control communication. For example, in the case where policy conditions of the local policy stores "when a distance to a communication partner in the virtual space exceeds a certain value, then, communication is disconnected, and when the distance is less than or equal to the certain value, then, communication is connected", then, the policy session control unit 223 compares the distance to the communication partner in the virtual space with the above-mentioned certain value, to judge whether connection should be established. The distance to the communication partner is held in the space modeler 221.

Next, referring to FIG. 13, the local policy 224 will be described.

The local policy 224 stored in the external storage 303 of the client 201 has one or more policy rules that describe communication conditions. Each policy rule has a condition part and an operation part. When a condition described in the condition part is satisfied, then, operation described in the operation part is executed. For example, the policy rule 1311 shown in the figure describes the following communication condition. Namely, the condition part describes that the distance between a communication partner (RemoteSite) and the user exceeds 50 m, and the operation part describes that, when the condition part is satisfied (i.e., when the distance exceeds 50 m), then, connection is not established. Similarly, the policy rule 1312 describes a communication condition that, when the distance between a communication partner and the user is less than or equal to 50 m, then, connection is established. Further, the policy rule 1313 describes a communication condition that, when the distance between a communication partner and the user is less than or equal to 10 m and the communication partner is intimate with the user, then, video image quality is made clear and audio sound quality is made clear. Further, the policy rule 1314 describes a communication condition that, when the distance between a communication partner and the user is less than or equal to 10 m and the communication partner is not intimate with the user, then, video image quality is made unclear and audio sound quality is made clear. Further, the policy rule 1315 describes a communication condition that, when the distance between a communication partner and the user is more than 10 m, then, video image quality is made unclear and audio sound quality is made inaudible.

Here, the expression "the communication partner is intimate with the user" means that information exchange between the user and the communication partner is important, and thus, it is allowable to make privacy of the user known to some degree to the communication partner. Further, a communication partner important to the user means a user who is necessary for distribution of tacit knowledge (such as know-how and how-to of job) meaning information and knowledge that can not be expressed by characters, words and numerals and is hard to transmit. As shown in the policy rule 1313, a policy rule can be described such that, even when an intimate user is at a certain distance in the virtual space, high quality voice and a high quality image are received. In detail, an address of an intimate user can be designated in a policy rule to specify an individual user. As for the other users, the other policy rules are applied such that a user at a long distance receives lower quality voice and image, or is disconnected. According to such communication control, high quality communication can be secured for an important or intimate user to grasp the state of that user easily and to promote distribution of tacit knowledge. On the other hand, as for the other users who are not important, an unnecessary waste of resources can be avoided. Further, average traffic between clients can be reduced.

In the above-described example of communication control using the local policy 224, control of high or low quality image and voice is based on a certain distance. However, the control is not limited to the two-stage control, and qualities of image and voice can be controlled gradually depending on the distance. For example, the qualities may be lowered gradually in inverse proportion to the distance. Or, a plurality of thresholds of distance may be provided to be used for changing the qualities, and thus to control the qualities by steps.

In Internet, conditions of going and coming communication can be each set individually. However, in the local policy 244, it is premised that the same condition applies to both communication directions, without designating a going or coming direction of communication. This is because there is a good possibility that a large difference in communication conditions prevents smooth communication and privacy protection. For example, it is assumed that, in communication between first and second users, the first user can not recognize the second user while the second user can recognize the first user. Then, there may arise a situation that the first user speaks of a topic uncomfortable to the second user since the first user can not recognize the second user, while the second user comes to know the topic uncomfortable to him since the second user can recognize the first user. Of course, when a direction of communication is designated in a policy rule, communication directions can be assigned with different policy rules respectively.

Further, although not shown, the following policy rule may be described for power control, for example.

```
if (distance(nearest RemoteSite) > 10) {
    power = low;
}
```

Here, "nearest RemoteSite" means not a specific communication partner but the nearest communication partner. Namely, the above policy rule means that, when a distance to the nearest communication partner is more than 10 m, then, power is set to a power saving mode. In the power saving mode, the CPU frequency of the client is lowered. As a result, although audio and graphics reproduction qualities may be lowered, resource consumption of a battery or a cell can be reduced or saved, and a longer nonstop operating time can be realized. The policy session control unit 223 refers to the above policy rule. When the condition part is satisfied, the policy session control unit 223 sends a predetermined signal (indicating the power saving mode) to the power control unit 225. Receiving the signal, the power control unit 225 lowers the operation frequency of the CPU 301 that executes programs of the client 201, and/or turn off the power of a hardware block that is not used, to reduce power consumption and to prevent wear of a battery. Thus, resource consumption of a battery or cell can be reduced.

In the above example of power control, setting to the power saving mode is controlled based on a certain distance. However, the control is not limited to the two-stage control, and the power may be controlled gradually depending on the distance. For example, the operation frequency of the CPU 301 may be lowered in inverse proportion to the distance. Or, a plurality of distance thresholds used for power control may be provided. As the distance becomes larger than those thresholds, circuits of unnecessary devices (for example, the camera 213 and the display 220) are shut off by steps.

Further, the judgment may be made based not on the distance to the nearest communication partner, and the judgment on whether the power mode to be set or not may be made based on a distance from a certain specific communication partner. Further, the power mode may be set not only when the distance to a communication partner satisfies a certain condition, but also when frequency of communication with another client is low.

The policy rules of the local policy 224 are inputted in advance by the user through various kinds of input units 305 and stored in the external storage 303. As a method of input, the following three methods can be considered. A first method is one in which characters (texts) as shown in FIG. 13 are inputted directly. For example, when the client is a desktop computer shown in FIG. 3C, which will be described below, then, characters can be inputted directly through a keyboard as the input unit 305. Or, the client may be, for example, a PDA or a wearable computer shown in FIG. 3A or 3B. Then, although the client does not have keys for inputting characters, a touch panel can be displayed on the display 220, and characters can be inputted through a virtual keyboard. Or, through a wireless LAN or Bluetooth, the client may be connected to another computer that can input characters, to receive inputted characters.

A second method is one in which a menu is used to input policy rules. Various policy rules such as shown in FIG. 13 are prepared in advance, and then, using a menu, the user selects whether each policy rule is used or not, to determine contents of the local policy 224.

A third method is one in which a form in a window system or WWW is used to input policy rules. In comparison with the first method, the third method is restricted with respect to input contents. However, in the third method, numerical values (such as a distance and values of properties) and character string values can be inputted, and accordingly, policy rules can be defined more finely than the second method.

Hereinabove, the client 201 of FIG. 2 has been described. In the client 201, the microphone 211, the camera 213, the pointing device 226, the earphones 217 and the display 220 are realized by hardware, while the audio encoder 212, the video encoder 214 and the power control unit 225 are realized by software, hardware or their combination. Further, the audio communication unit 215, the video communication unit 218, the space modeler 221 and the policy session control unit 223 are ordinarily realized by software.

Next, referring to FIGS. 3A, 3B and 3C, examples of the clients 201, 202 and 203 will be described.

A client shown in FIG. 3A has a size and functions near to a PDA or a handheld computer. A client body 230 comprises a camera 213, a display 220, a pointing device 226 and an antenna 237, while a headset connected to the body 230 comprises earphones 217 and a microphone 211.

The pointing device 226 has a forward movement button 231, a backward movement button 232, a leftward movement button 233, a rightward movement button 234, a selection button 235 and jog dial 236. For example, the forward movement button 231 is pushed to advance several ten centimeters in the virtual space; the backward movement button 231 is pushed to move back several ten centimeters in the virtual space; the leftward movement button 233 is pushed to turn several degrees in a counterclockwise direction in the virtual space; and the rightward movement button 234 is pushed to turn several degrees in a clockwise direction in the virtual space. The jog dial 236 realizes equal functions with the forward and backward movement buttons 231 and 232, and can perform a small forward or backward movement up to a large forward or backward movement by a small number of operations. The pointing device 226 may be provided with an additional jog dial having equal functions with the leftward and rightward movement buttons to make a small turn up to a large turn by a small number of operations also. Further, although the headset shown in the figure is wired to the body 230, the headset may be connected through Bluetooth or IrDA (infrared). Further, the client is connected to the network 101 by means of the antenna 237 through a wireless LAN.

A client shown in FIG. 3B is an example of wearable computer. A client body 241 that looks like bows of a pair of spectacles is provided with a microphone 211, a camera 213, earphones 217 and a display 220.

The display 220 is a head mounted display, and forms a virtual image several ten centimeters ahead of a user who wears the client body 241, or forms a three-dimensional image ahead of the user. In the present embodiment, an untransmissive head mounted display is used as the display 220. However, a transmissive head mounted display may be used. In the case of a transmissive head mounted display, an image of the virtual space may be superposed on the real space so that directions in the virtual space can be expressed directly. Further, when a transmissive stereoscopic display, i.e., a display that superposes an image on the real space stereoscopically, is used, then, not only directions but also distance can be expressed directly. As a result, an intuitive user interface can be realized.

Although FIG. 3B does not show a pointing device 226, the display 220 has a built-in acceleration sensor for detecting acceleration in the forward and backward directions and the leftward and rightward directions, and the acceleration sensor is used as the pointing device 226. For example, when the acceleration sensor detects a forward acceleration generated by a forward movement of the user's head, then, the user's location in the virtual space advances several ten centimeters—several meters according to the strength of the acceleration. When the acceleration sensor detects a backward acceleration generated by a backward movement of the user's head, then, the user's location in the virtual space moves back several ten centimeters—several meters according to the strength of the acceleration. Further, when the acceleration sensor detects an acceleration generated by turning of the use's head in a counterclockwise or clockwise direction, then, the user's direction in the virtual space turns several—several ten degrees in the counterclockwise or clockwise direction according to the strength of the acceleration. Using this acceleration sensor, the user does not need to use his eyes or hands, and can use his eyes or hands for other operations. Thus, the user can easily change the user's location in the virtual space while moving in the real space or conducting other operations. Further, the client may be connected to the network 101 through a wireless LAN or Bluetooth, using a communication unit not shown.

A client shown in FIG. 3C is a desktop computer. A computer body 251 is connected with a microphone 211, a camera 213, a pointing device 226, a display 220, speakers 252 functioning as a substitute for earphones, and a keyboard 253. As the pointing device 226, a track ball is used. A mouse is restricted in its moving range, and should be lifted up for moving out of the moving range. When a track ball is used, it can be turned without limitation, and favorably, it is possible to move easily to any location on a plane. Further, when three or more speakers for stereophonic reproduction such as 4-channel or 5.1-channel speakers are used as the speakers 252, voice from the rear can be easily expressed also. Further, the client may be connected to a LAN through twisted wires, and further to the network 101.

Figure 4B:
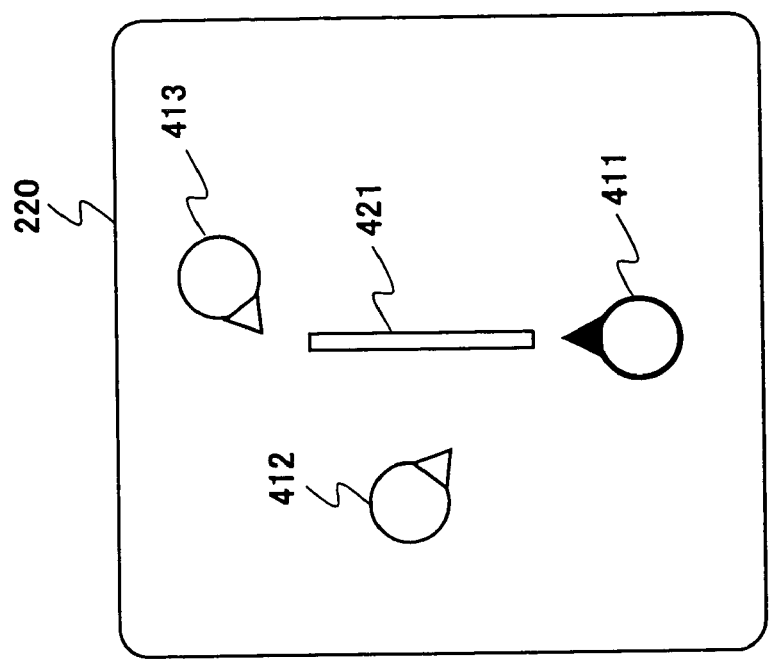
FIGS. 4A and 4B show examples of display screen showing a virtual space in an embodiment of the present invention.

Next, referring to FIGS. 4A and 4B, will be described displaying the virtual space on the display 220. Displayed contents shown in FIGS. 4A and 4B illustrate an example where a first user using the client 201 shares the virtual space with second and third users using the clients 202 and 203.

Figure 4A:
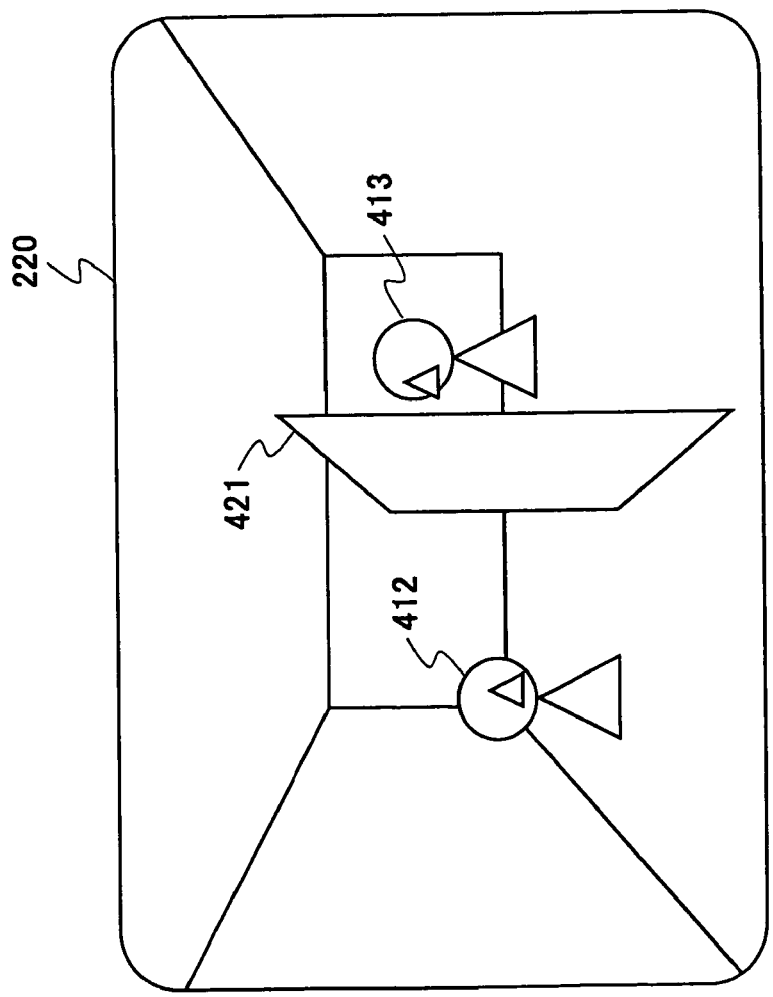

In FIG. 4A, rendering is carried out employing a three-dimensional graphics technique. Namely, the space modeler 221 generates a two-dimensional image based on three-dimensional data stored in the memory 302 or the external storage 302, and displays the generated image on the display 220. The three-dimension data are, for example, the size of the space, the properties of the virtual space such as textures of the walls and the ceiling, the location of the user himself in the virtual space, and the other user's information.

FIG. 4A displays a two-dimensional image obtained by seeing the walls, the ceiling and the floor, and, as objects, two avatars 412 and 413 representing other users as communication partners and a screen 421 arranged in the virtual space, from the viewpoint determined by the location of the user himself in the virtual space. To change the viewpoint in the virtual space, the pointing device 226 or the like is used to change the location or direction of the user himself. When the viewpoint is changed, a view from the changed viewpoint is displayed in real time on the screen.

The avatar 412 stands for the second user using the client 202, and the avatar 413 the third user using the client 203. Although not shown in FIGS. 4A and 4B, an image of the second user taken by the camera 213 of the client 202 is pasted on the avatar 412 by texture mapping, and an image of the third user on the avatar 413. When a user as a communication partner turns, also the texture map is turned, and accordingly, it is possible to grasp directions toward which the second and third user face. Although FIG. 4A shows the avatars 412 and 413 by figures (images) only, user information (for example, character information such as addresses) of the users corresponding to the avatars 412 and 413 may be displayed in the neighborhood of those figures.

The screen 421 is one of the objects in the virtual space, and provided for interrupting sound from a specific direction to make a conference or the like proceed smoothly. The screen 421 is a kind of wall that partitions the virtual space, and sight and voice are interrupted by providing such a screen. In the present embodiment, a screen can be installed at will when the user inputs an identifier, a size, a location and a material of the screen through the input unit 305 of the client 201, the space modeler 221 receives the inputted values and notifies the presence server 110 of the inputted values through the presence provider 222. Further, a screen withdrawal instruction and an identifier to withdraw may be received from the user, to withdraw a specific screen. Sound effects of the screen 421 can be simulated by using the three-dimensional graphics technique and the three-dimensional audio technique. Simulation of voice can be realized by using the obstruction function of a three-dimensional audio API.

FIG. 4B shows the virtual space as a top view, without using the three-dimensional graphics technique. Based on the properties of the virtual space, the location of the user himself in the virtual space and the information on the other users stored in the memory 302 or the external storage 303, the space modeler 221 displays this two-dimensional image obtained by seeing from just above the second and third avatars 412 and 413 representing the users as the communication partners, a first avatar 411 representing the user of the client 201, and the screen 421 arranged in the virtual space.

When the avatar 411 standing for the first user (the user himself) of the client 201 is displayed, it is possible to accurately express the positional relations between the user of the client 201 and the communication partners, i.e., the users of the clients 202 and 203. Although not shown in the figure, when a scale is shown on the display 220, distance can be expressed accurately. Further, it is possible to show a user existing behind the user of the client 201, and thus, it is an advantage that there is little fear of overlooking a user approaching from the rear. Similarly to FIG. 4A, user information on each avatar may be displayed in the neighborhood of the corresponding figure.

As a method of displaying the virtual space on the display 220, one of the following two methods can be selected. A first method is one in which the virtual space displayed is fixed always, and the user of the client 201 is displayed being moved or turned in the virtual space displayed. A second method is one in which the location and direction of the client 201 are fixed, and the virtual space and the other users in the virtual space are displayed moving and turning in relation to the user 201 as the center. FIG. 4A employs the second method. FIG. 4B can employ either of the first and second methods.

The first method has an advantage that it is easy to grasp the location of the user of the client 201 in the virtual space. The second method has an advantage that it is easy to understand the relation between voice and graphics display.

Next, referring to FIGS. 5 through 10, will be described procedures of the client 201.

Figure 5:
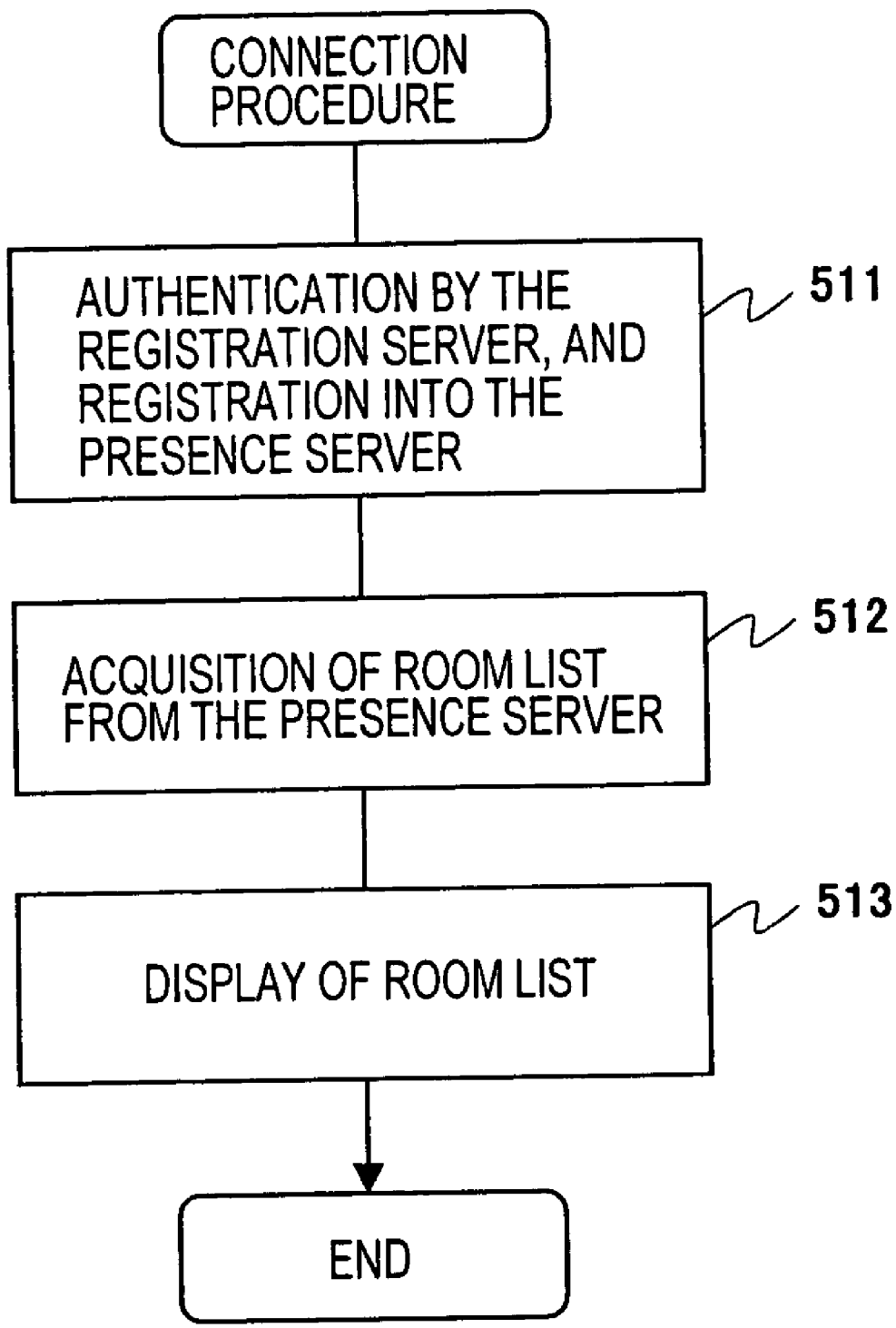
FIG. 5 is a flowchart showing network connection processing of a client in an embodiment of the present invention.

FIG. 5 shows a procedure for connecting the client 201 to the network 101. The present embodiment is an always-connected communication system, and the connecting procedure of FIG. 5 is executed at the time of turning on power. Further, also when a user inputs or changes his user name, the present procedure is executed.

First in the step 511, to connect to the network 101, the policy session control unit 223 sends a login message including identification information and authentication information of the user to the SIP proxy server 120. Receiving the login message, the SIP proxy server 120 sends an authentication request message for the user to the registration server 130. Then, the registration server 130 authenticates the user's identification information and authentication information, and sends the user's identification information to the presence server 110.

For communication between the SIP proxy server 120 and the registration server 130, it is considered to use a REGISTER message of the protocol SIP (Session Initiation Protocol) prescribed in the document RFC 3261 of IETF. The SIP proxy server 120 sends a REGISTER message to the registration server 130 periodically. Also when the IP address of the client 201 is changed, the SIP proxy server 120 sends a REGISTER message to the registration server 130. In the case where authentication and security functions stronger than the SIP protocol should be realized, another protocol may be used to send the authentication request message to the registration server 130.

Although a special protocol can be used for communication between the presence provider 222 of the client 201 and the presence server 110, it is possible to use a SUBSCRIBE message of SIP prescribed in the document RFC 3265 (Session Initiation Protocol (SIP)—Specific Event Notification) of IETF, or an extension of that message. SUBSCRIBE message is a message of previously requesting reception of a notification at the time of event occurrence, and is called also an event request message. Thus, in communication with the presence server 110, it is sufficient that the presence server 110 is designated as a partner, and a notification of an event occurred with respect to a room list and a visitor list managed by the presence server 110, namely, a notification of generation or extinction of a virtual space is requested. A message sent by a user having user identification (i.e., a user address) user1@servers.com to a list of the virtual space rooms@servers.com is as follows.

SUBSCRIBE sip:rooms@servers.com SIP/2.0
  From: sip:user1@servers.com
  To: sip:rooms@servers.com As a matter of fact, the above message is sent not to the above list of the virtual space but to the presence server 110. This is realized when the presence server 110 previously registers at the registration server 130 the IP address of the presence server 110 as the IP address corresponding to rooms@servers.com. When a notification of an event is requested by a SUBSCRIBE message, then, a corresponding notification of the event is sent by a NOTIFY message of SIP prescribed in RFC 3265.

In the case where the policy session control unit 223 uses a SUBSCRIBE message to perform message sending and receiving of SIP, the presence provider 222 communicate with the presence server 110 through the policy session control unit 223 and the SIP proxy server 120.

In the case of a virtual space having many visitors (users), to receive notifications of all the events becomes an unnecessary load on the client 201. Thus, when the above-mentioned SUBSCRIBE message is added with information processed from a part of the local policy 224, it is possible to designate previous filtering of events in the presence server 110 to receive notifications of important events only.

Next, in the step 512, the presence provider 222 receives the room list from the presence server 110. Here, when a SUBSCRIBE message is used in the step 511, then, the room list is received in the form of a NOTIFY message as the above-mentioned event notification message. Namely, the room list is included in the contents of a NOTIFY message. Then, in the step 513, the presence provider 222 shows the received room list on the display 220.

Figure 6:
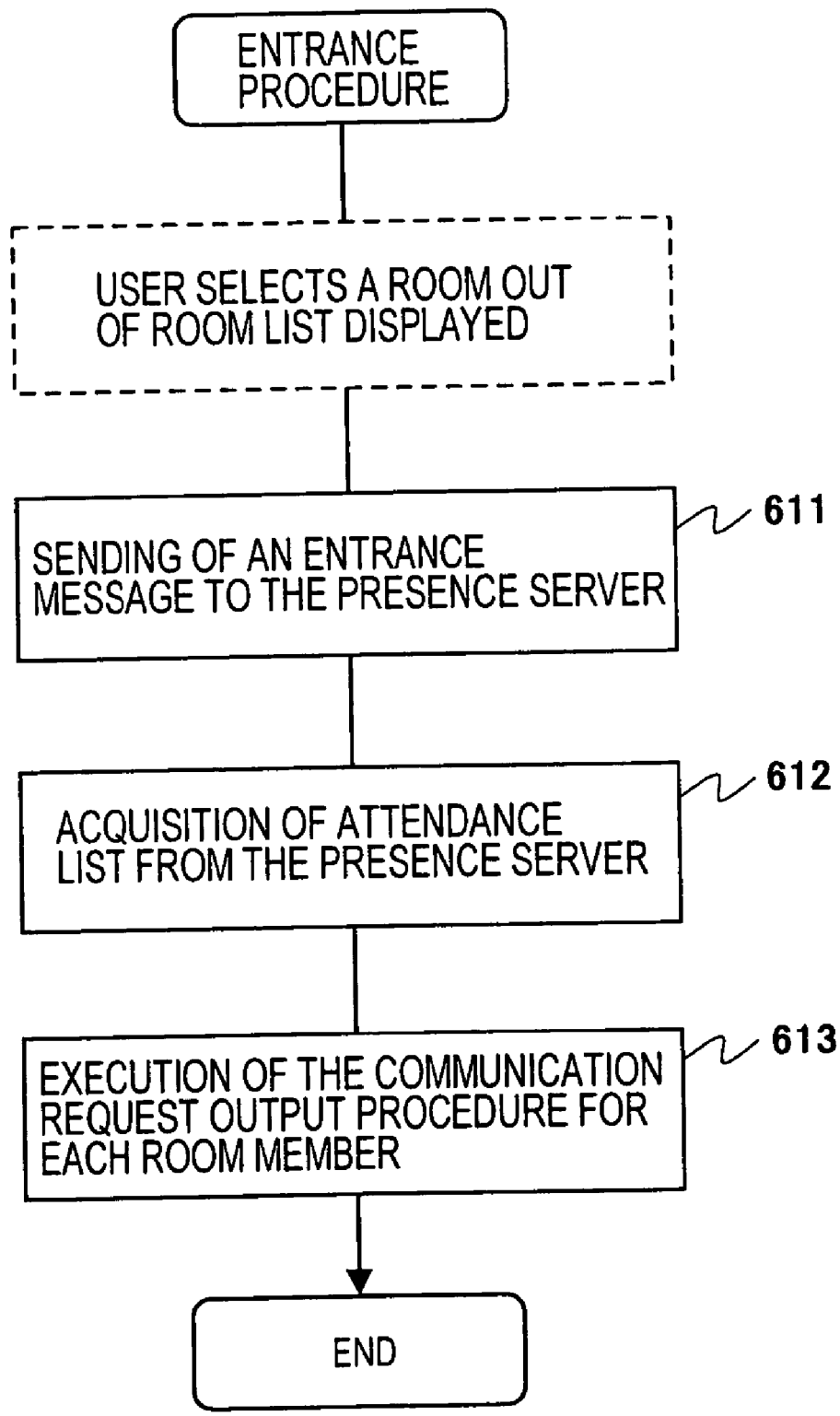
FIG. 6 is a flowchart showing entrance processing of a client in an embodiment of the present invention.

FIG. 6 shows a procedure of the client 201 when the user selects a room that he wishes to enter from the room list shown on the display 220. When the user selects a room, then, in the step 611, the presence provider 222 of the client 201 sends an entrance message (enter) designating user's identification information and positional information in the virtual space to the presence server 110. Although a special protocol can be used for sending an entrance message, a SUBSCRIBE message of SIP may be used also. Namely, a SUBSCRIBE message whose recipient is the selected room is used as an entrance message. A SUBSCRIBE message requests notification of events (for example, entrance, exit and movement of a user, and changes of the properties of the virtual space) occurred in the virtual space of the selected room. When a user having an address user1@servers.com enters a room having a room name roo1@servers.com, then, a message having the following header and, as contents, positional information of the user is sent.

SUBSCRIBE sip:room1@servers.com SIP/2.0
  From: sip:user1@servers.com
  To: sip:room1@servers.com As for the selection of a room, although one room is selected usually, a plurality of rooms may be selected at the same time. When a plurality of rooms is selected, then, the presence provider 222 sends entrance messages for all the selected rooms to the presence server 110.

Next, in the step 612, the presence provider 222 receives an attendance list listing users who are now in the selected room, from the presence server 110. When a SUBSCRIBE message is used as an entrance message, the attendance list in the form of a NOTIFY message corresponding to the SUBSCRIBE message is sent to the presence provider 222. It is assumed that the attendance list includes user identification information of the users in the room and their positional information in the virtual space.

Next, in the step 613, the policy session control unit 223 executes the below-mentioned communication request output procedure (See FIG. 9) for each user included in the attendance list, to determine conditions of communication with each user.

Further, although a procedure at the time when a user leaves a room is not shown, the presence provider 222 receiving an exit instruction from a user sends an exit message including the user identification information to the presence server 110.

Figure 7:
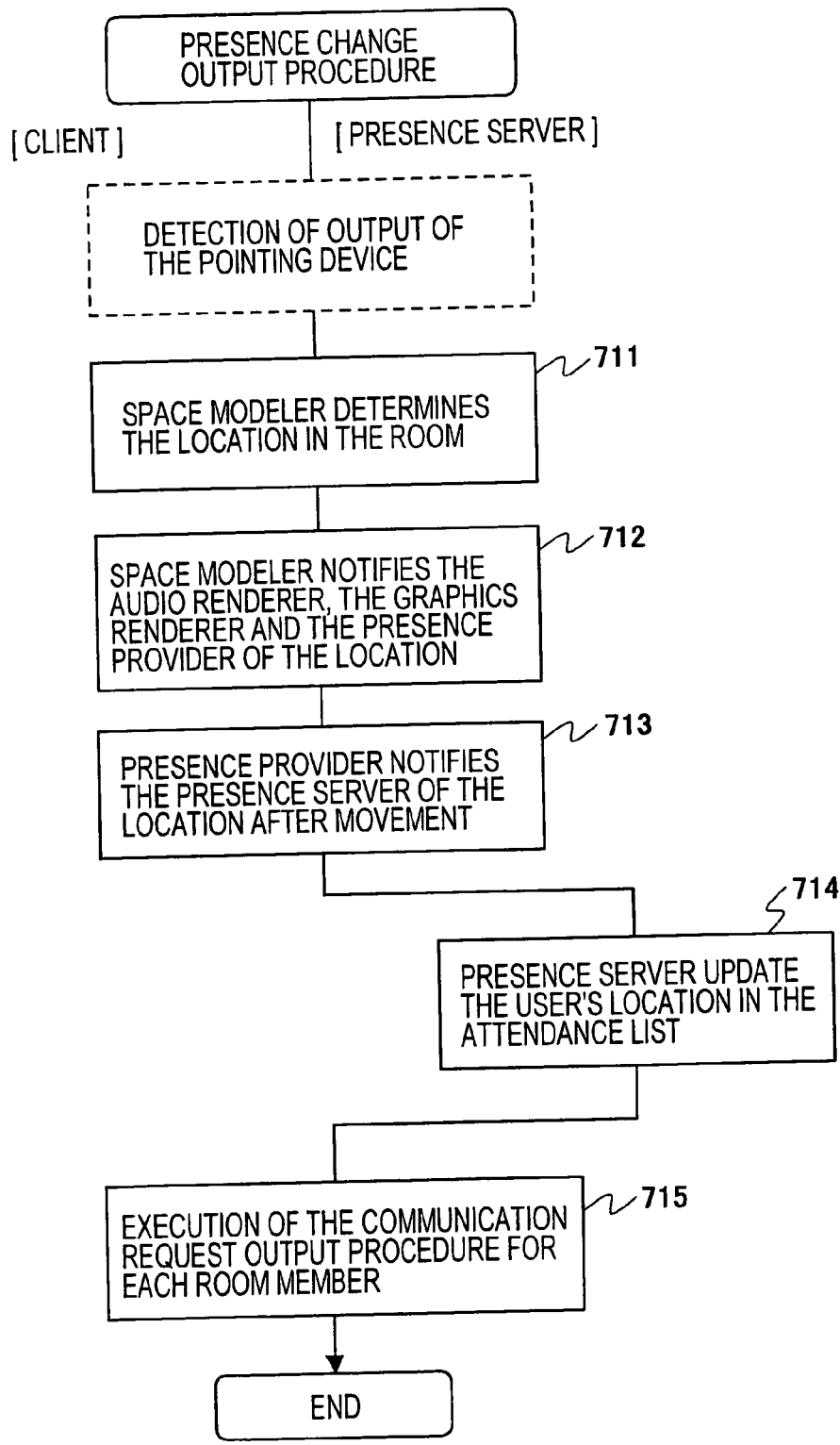
FIG. 7 is a flowchart showing user movement processing of a client in an embodiment of the present invention.

FIG. 7 shows a procedure in the case where a user changes his presence, i.e., moves in a room in the virtual space. When a user moves, the user operates the pointing device 226 to input movement information to the space modeler 221. Detecting the input from the pointing device 226, the space modeler 221 calculates the user's location after the movement, using the user's old location in the room and the movement information inputted from the pointing device 226. Next, in the step 712, the space modeler 221 notifies the audio renderer 216, the graphics renderer 219 and the presence provider 222 of the location after the movement. The audio renderer 216 calculates how voices of the communication partners are heard at the notified location in the virtual space after the movement. Then, based on the calculation, the audio renderer 216 performs processing such as control of sound volume, reverberation and filtering on the voices of the users (the communication partners) outputted from the audio communication unit 215, and controls sound effects to obtain sound to be heard by the user of the client 201 at his location in the virtual space, and updates the three-dimensional sound. Further, the graphics renderer 219 changes the viewpoint based on the notified location in the virtual space after the movement, calculates how the communication partners are seen in the virtual space, generates image data to output on the screen as a view from the changed viewpoint, and updates the three-dimensional graphics.

Next, in the step 713, the presence provider 222 notifies the presence server 110 of the location after the movement. When a SIP protocol is used, a NOTIFY message is used. Although a NOTIFY message is usually sent as a result of receiving a SUBSCRIBE message, the above-mentioned NOTIFY message does not have a corresponding SUBSCRIBE message. Thus, as an alternative, it is considered that, when the presence server 110 receives an entrance message from the client 201, the presence server 110 sends not only the attendance list but also a SUBSCRIBE message corresponding to the above-mentioned NOTIFY message. In the case where a SUBSCRIBE message as an event request message is sent also at the time of sending the attendance list, it is possible to designate in the contents of the SUBSCRIBE message a requesting frequency or requesting interval of NOTIFY messages. Then, when a processing load on the presence server 110 is heavy, the processing load can be lowered by lowering the frequency of NOTIFY messages from the client 201. Further, also to a client to whom a SUBSCRIBE message has been sent already, it is possible to invalidate that message and to send a new SUBSCRIBE message, designating a requesting frequency or interval anew.

Next, in the step 714, based on the location after the movement, notified from the presence provider 222, the presence server 110 updates the location of the user in the attendance list. Next, in the step 714, the policy session control unit 223 of the client 201 executes the below-described communication request output procedure (See FIG. 9) for each user included in the attendance list, to determine conditions of communication with each user.

In the case where occurrence of events in the pointing device 226 is frequent, load becomes too heavy when the steps 712 through 715 are executed every time an event occurs. Thus, it is possible that, in the step 711, the frequency is judged, and the steps 712 through 715 are executed only when a predetermined time has passed from the last occurrence of an event.

Figure 8:
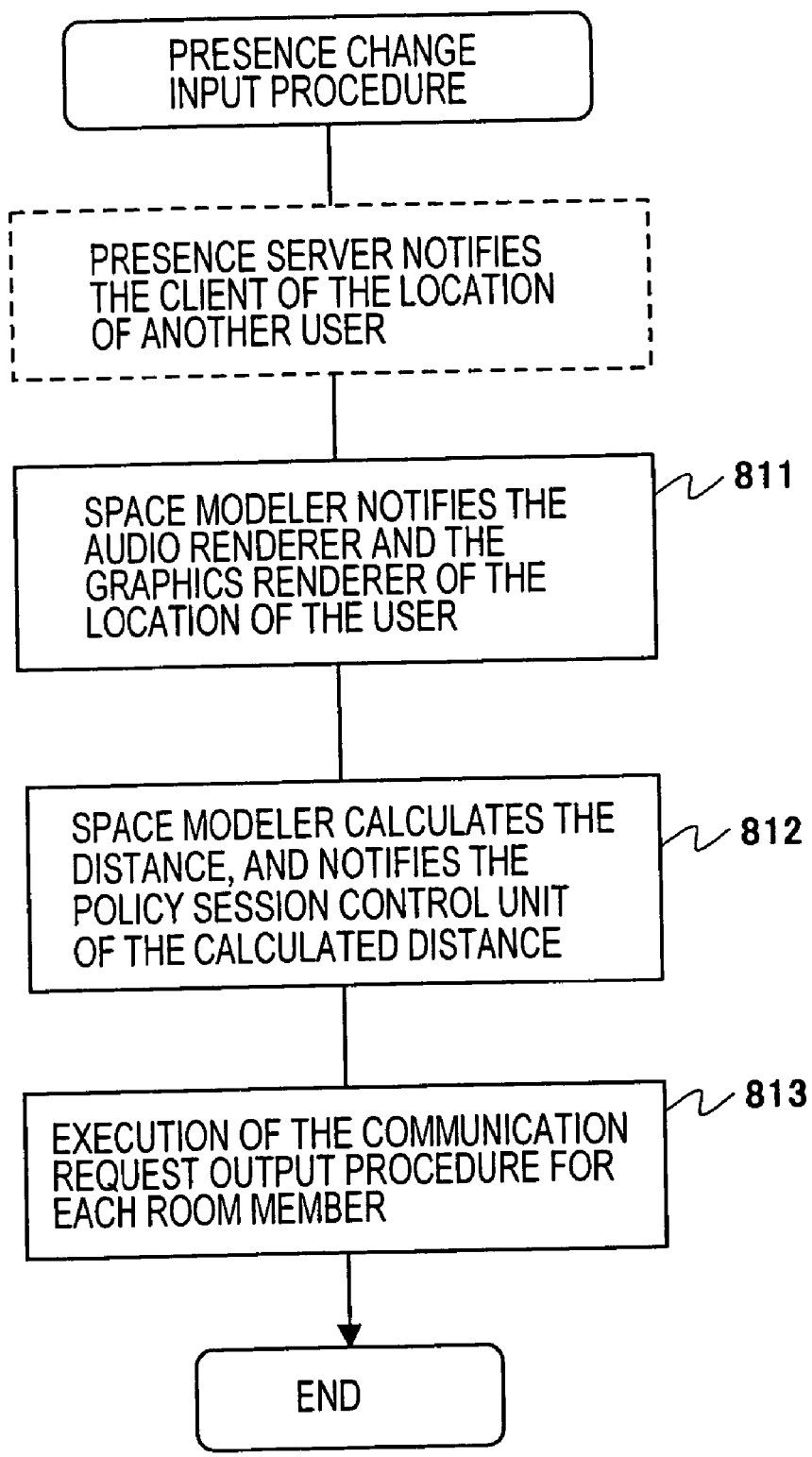
FIG. 8 is a flowchart showing user movement processing of a client in an embodiment of the present invention.

FIG. 8 shows a presence change input procedure, i.e., a procedure in the case where the presence server notifies the client 201 of a location of another user.

The presence server 110 notifies the presence provider 222 of the client 201 of a change of a user of another client. Receiving this notification, in the step 811, the presence provider 222 notifies the space modeler 221 of the changed user location. The space modeler 221 stores the notified location, and notifies the audio renderer 216 and the graphics renderer 219 of that location. The audio renderer 216 and the graphics renderer 219 update the three-dimensional sound and the three-dimensional graphics, similarly to the step 712 of FIG. 7.

Next, in the step 812, the space modeler 221 calculates the distance between the location of the user of the client 201 and the user whose location change is notified in the room in the virtual space, and notifies the policy session control unit 223 of the calculated distance. In the step 813, the policy session control unit 223 executes the below-described communication request output procedure (See FIG. 9) for each user included in the attendance lit, to determine conditions of communication with each user.

The communication conditions are determined twice in the communication request output procedure (the step 715) of FIG. 7 and in the communication request output procedure (the step 813) of FIG. 8. This considers the case where the local policies 224 set for respective clients have inconsistent (or different) communication conditions between a client as a communication source and a client as a communication destination.

Figure 9:
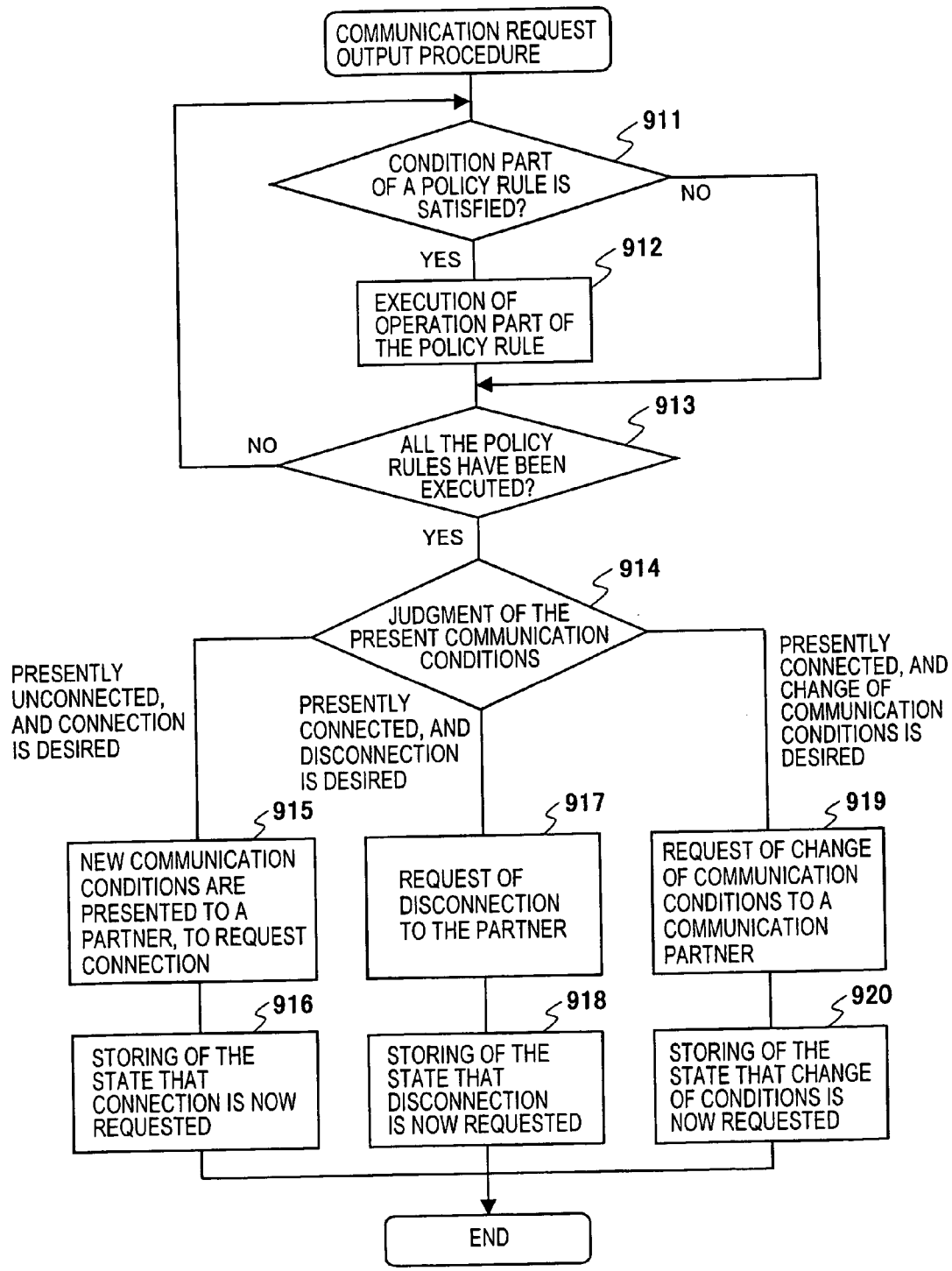
FIG. 9 is a flowchart showing communication request output processing of a client in an embodiment of the present invention.

Next, referring to FIG. 9, will be described a procedure for the policy session control unit 223 to output a communication request to another client through the SIP server 112 when various requests occur in the client. The procedure of FIG. 9 is a procedure of the type where the SIP server has only the minimum intelligence and, in almost all cases, processing is executed in the client.

First, the policy session control unit 223 determines new communication conditions based on the distance between the user and a user as a communication partner in the virtual space and the above-described local policy 224. In detail, the policy session control unit 223 executes the processing of the steps 911 and 912 for all the policy rules included in the local policy 224. In the step 911, it is judged whether the communication in question satisfies the condition part of the policy rule in question. When the condition part is satisfied, then, the operation part of the policy rule is executed in the step 912. Namely, the communication conditions of the audio communication unit 215 or the video communication unit 218 are set to the contents described in the operation part of the policy rule. On the other hand, when the condition part of the policy rule in question is not satisfied in the step 911, then, the operation part is not executed in the step 912 and it is judged in the step 913 whether all the policy rules are subjected to the processing of the steps 911 and 912. When the mentioned processing is executed for all the policy rules, then, the communication conditions set by this execution are determined as new communication conditions, and the procedure proceeds to the step 914 (judgment on the present communication conditions). When there remains an untreated policy rule, then, the step 911 is executed for that policy rule.

Here, the policy rules shown in FIG. 13 are taken as examples to describe the processing of the steps 911 and 912 in detail.

In a first case where, seen from the user, a user as a communication partner is located at a distance of 60 m, the policy rules 1311 and 1315 are applied. Namely, according to the policy rule 1311, this communication partner is disconnected. The policy rule 1315 is valid only when connection is established. Thus, in this case, the operation part of the policy rule 1315 becomes invalid (i.e., is not executed). Accordingly, the new communication condition in this case is a disconnection request.

In a second case where, seen from the user, a user as a communication partner is located at a distance of 30 m, the policy rules 1312 and 1315 are applied. Namely, according to the policy rule 1312, connection is established with the communication partner in question when that communication partner is not connected yet. Next, according to the policy rule 1315, the audio communication unit 215 sends voice that is processed to be inaudible and to have a reduced bandwidth to the communication partner, and the video communication unit 218 sends an image that is processed to be unclear and to have a reduced bandwidth to that communication partner. Thus, the new communication conditions in this case are a connection request and sending of lower quality of voice and a lower quality of image.

To make voice inaudible, it is sufficient to average voice amplitudes in a time of several ms—several ten ms, and to modulate a voice (for example, a sine wave) very different from the voice in question to have this average amplitude. As a result, it is possible to generate a voice that can be recognized as a sound but is entirely inaudible. Further, to make an image unclear, the image may be expressed as a signal coded in the MPEG format having a high compressibility. As a result, also the bandwidth can be reduced.

Further, in the case where the user and the communication partner have different policy rules, then, the policy rules are set to the weaker ones in the below-mentioned communication request input procedure (See FIG. 10) in the step 1013 of changing the communication conditions. Namely, the communication conditions are set to the more unclear ones, or, when there exist an audible policy and an inaudible policy, to the inaudible policy. As a result, it is possible to realize the same communication conditions between communication from a first client to a second client and communication from the second client to the first client.

In a third case where, seen from the user, there is a policy rule indicating that a user as a communication partner is in an intimate relation, and the communication partner is located at a distance of 5 m, then, the policy rules 1312 and 1313 are applied. Namely, according to the policy rule 1312, connection is established with the communication partner when it is not established yet. Further, according to the policy rule 1313, the audio communication unit 215 sends a wide-band voice, which has not processed especially, to the communication partner, and the video communication unit 218 sends a wide-band image, which has not processed especially, to the communication partner. Thus, the new communication conditions in this case are a connection request and sending of a high-quality voice and a high-quality image. In the case where the user and the communication partner have different policy rules, then, the communication conditions are set to the weaker ones, similarly to the second case.

In a fourth case where, seen from the user, there is not a policy rule indicating that a user as a communication partner is in an intimate relation, and the communication partner is located at a distance of 5 m, then, the policy rules 1312 and 1314 are applied. Namely, according to the policy rule 1312, connection is established with the communication partner when it is not established yet. According to the policy rule 1314, the audio communication unit 215 sends a voice that is inaudible and processed to have a reduced bandwidth to the communication partner, and the video communication unit 218 sends a wide-band image, which has not processed especially, to the communication partner. Thus, the new communication conditions in this case are a connection request and sending of a low-quality voice and a high-quality image. In the case where the user and the communication partner have different policy rules, then, the communication conditions are set to the weaker ones, similarly to the second case.

Next, in the step 914, based on the present communication conditions and the new communication conditions determined in the steps 911–913, a communication request to be made with respect to the client of the communication destination is judged (classified). This judgment classifies the communication request as one of three cases, a first case that connection is not established now and connection is to be requested, a second case that connection is established now and disconnection is to be requested, and a third case that connection is not established now and the communication conditions should be changed. In the first case, the procedure goes to the step 915, in the second case to the step 917, and in the third case to the step 919.

As for the first case, in the step 915, the policy session control unit 213 makes a connection request, presenting the new communication conditions to the client of the communication partner through the SIP proxy server. As the connection request, an INVITE message of SIP is used. An INVITE message invites the destination user to conversation.

When the client 201 of the user having an address user1@servers.com makes a connection request to the client 202 of the user having an address user2@servers.com, then, the policy session control unit 223 sends a message that has the following header and includes the new communication conditions as its contents.

INVITE sip:user2@servers.com SIP/2.0
From: sip:user1@servers.com
To: sip:user2@servers.com As a protocol for presenting the communication conditions, there is the protocol SDP (Session Description Protocol) prescribed in the document RFC 2327 of IETF, which has been used conventionally. However, to present the new communication conditions in the present embodiment, SDP should be extended.

Next, in the step 916, the policy session control unit 223 records in itself that the connection is now requested, and ends the communication request output procedure. The procedure is ended without awaiting a reply from the communication partner, because a reply to the request is not sent always immediately. Further, the record of the effective connection request is used for resending the INVITE message again when a reply from the communication partner does not reach within a predetermined time. When the policy session control unit 223 receives a reply to the connection request from the communication partner, then, the above record is cleared.

As for the second case, the policy session control unit 223 requests disconnection of the connection to the client 202 or 203 as the communication partner, through the SIP proxy server 120. To disconnect communication, usually a BYE message of SIP is used, and the present embodiment can use a BYE message. However, a BYE message disconnects the connection without awaiting a reply from the communication partner. Thus, in the case where mediation or negotiation is required for the disconnection to ensure consistency of the policy rules between the client 201 and the client of the communication partner, then, a BYE message is not used, and an INVITE message is used similarly to the case of connection. Namely, a communication disconnection request is described as contents of an INVITE message. A communication disconnection request can be expressed by a SDP message designating the communication speed zero, for example.

Next, in the step 918, the policy session control unit 223 records in itself that the disconnection is now requested, and ends the communication request output procedure. The procedure is ended without awaiting a reply from the communication partner, because a reply to the request is not sent always immediately. Further, recording of the fact that the disconnection is now requested is similar to the step 916, as well as clearing of the record.

As for the third case, in the step 919, the policy session control unit 223 requests a change of communication conditions to the client as the communication partner, through the SIP proxy server 120. Also in the case of changing the communication conditions, an INVITE message of SIP is used, and the contents of the message include the new communication conditions after the change. An SDP describes the communication conditions after the change. Next, in the step 918, the policy session control unit records in itself that the change of the communication conditions are now requested, and ends the communication request output procedure. The procedure is ended without awaiting a reply from the communication partner, because a reply to the request is not sent always immediately. Further, recording of the fact that the change of the communication conditions is now requested is similar to the step 916, as well as clearing of the record.

Figure 10:
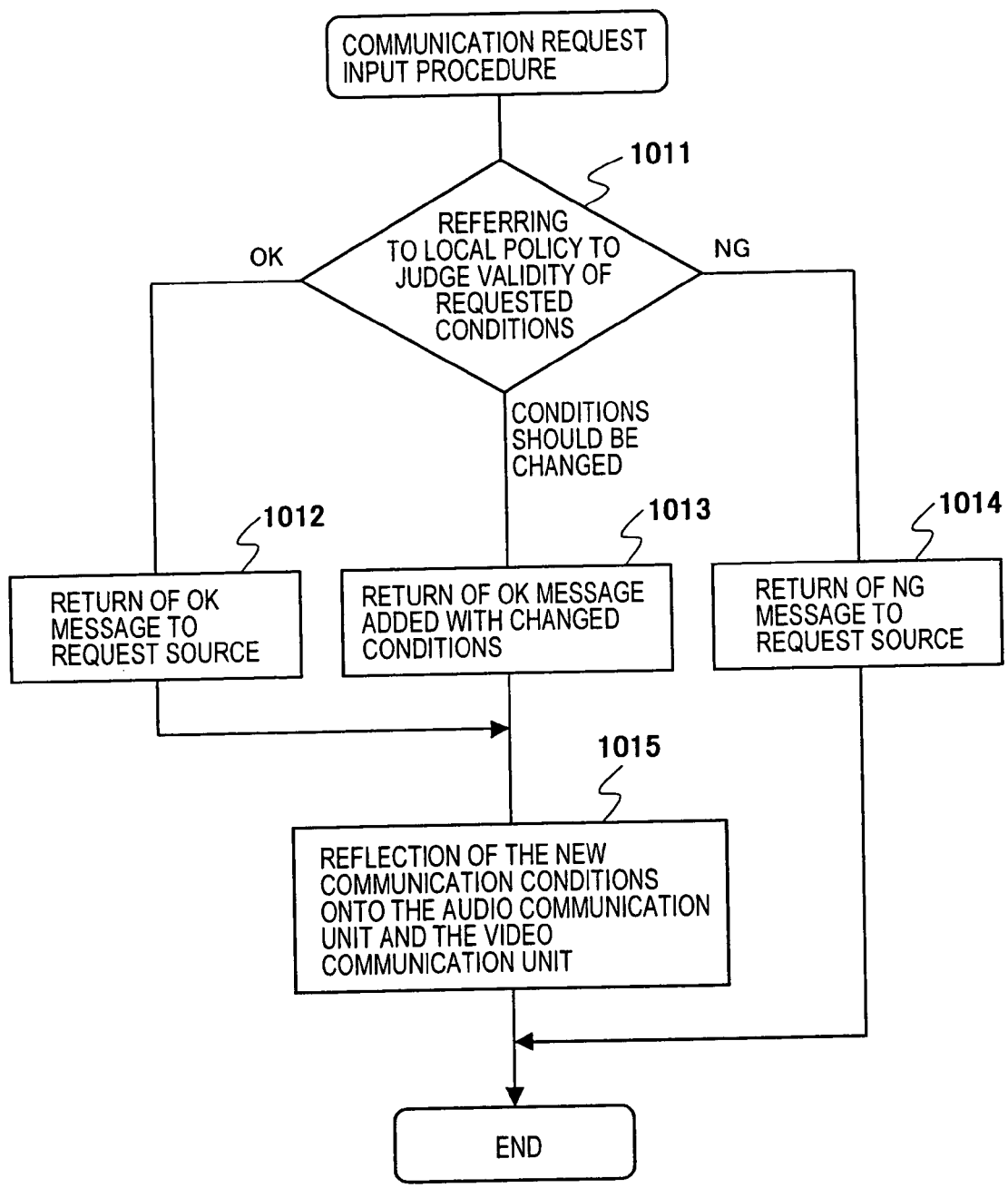
FIG. 10 is a flowchart showing communication request input processing of a client in an embodiment of the present invention.

FIG. 10 shows a communication request input procedure for a communication request sent from a client as a communication partner to the policy session control unit 223 through the SIP proxy server 120. When the communication request reaches the policy session control unit 223, then, first in the step 1011, the policy session control unit 223 refers to all the policy rules of the local policy 224 to judge whether the requested conditions sent are valid. In the case where the requested conditions are judges to be valid as they are, the procedure proceeds to the step 1012. In the case where the requested conditions are judged to be valid when a part of the requested conditions are changed, then, the procedure goes to the step 1013. And, in the case where the requested conditions are judged to be invalid, then, the procedure goes to the step 1014.

In the step 1012, the policy session control unit 223 returns an OK (200) message of SIP added with no content, to the request source through the SIP proxy server 120, and proceeds to the step 1015. The OK message with no content expresses that the request of the communication partner is accepted as it is. In the step 1013, the policy session control unit 223 returns an OK message of SIP added with contents describing the communication conditions partly changed by the client 201, to the request source through the SIP proxy server 120, and proceeds to the step 1015.

In the step 1015, in the case where the communication request of the communication partner is judged to be valid as it is (the step 1012), the communication conditions are reflected onto the audio communication unit 215 and the video communication unit 218. In the case where the communication request of the communication partner is partly changed (the step 1013), the changed communication conditions are reflected onto the audio communication unit 215 and the video communication unit 218. Then, the communication request input procedure is ended.

In the step 1014, the policy session control unit 223 rejects the request by returning a Not acceptable (406) message of SIP as an NG message rejecting the communication request, to the request source through the SIP proxy server 120, and ends the communication request input procedure.

Hereinabove, various procedures in a client have been described.

Next, will be described a functional configuration and procedures in the presence server 110, while the registration server 130 and the SIP proxy server 120 are same as ones in the conventional communication using SIP, and description of them is omitted here.

Figure 11:
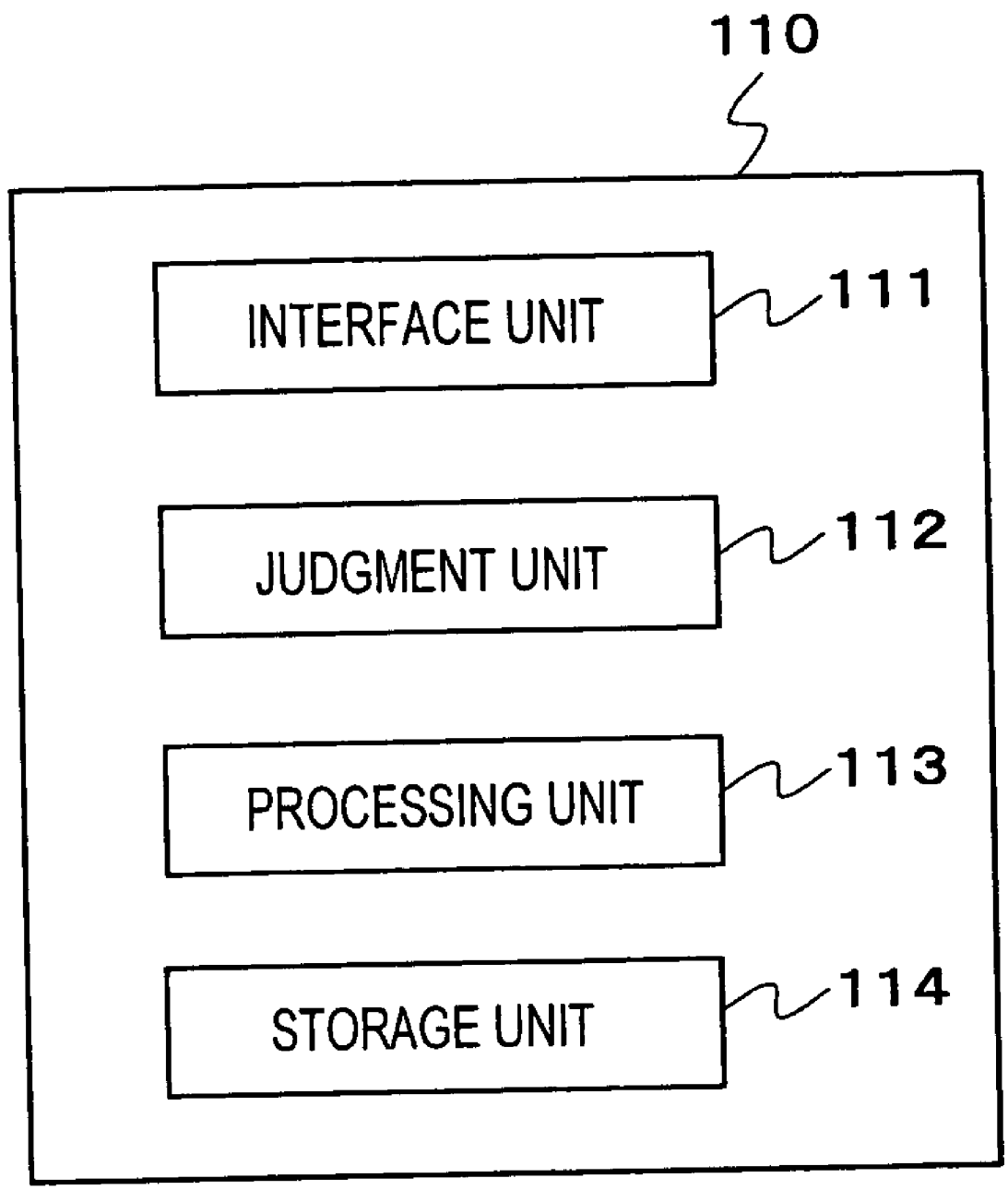
FIG. 11 is a functional block diagram showing a presence server in an embodiment of the present invention.

FIG. 11 shows a functional configuration of the presence server 110. The presence server 110 comprises an interface unit 111 for sending and receiving various pieces of information to and from a client, a judgment unit 112 for judging a kind of a message from a client, a processing unit 113 for performing processing corresponding to the judgment result and for controlling the interface unit with respect to a sending frequency, and a storage unit 114 for managing and storing properties of a virtual space, events (entrances, exits, movements, etc. of users) occurred in a virtual space. The storage unit 114 stores in advance properties of some virtual spaces managed by the presence server 110. As described above, a user selects a virtual space that he wants to enter, out of those virtual spaces (See FIGS. 5 and 6). Thereafter, the client receives various messages from the user who has entered the virtual space, and sends those messages to the presence server 110. Thus, various events occur in each virtual space. The storage unit 114 stores the above information into the memory 302 or the external storage 303. Further, the above functions are realized when the CPU 301 executes prescribed programs loaded on or stored in the memory 302 of the presence server 110.

Figure 12:
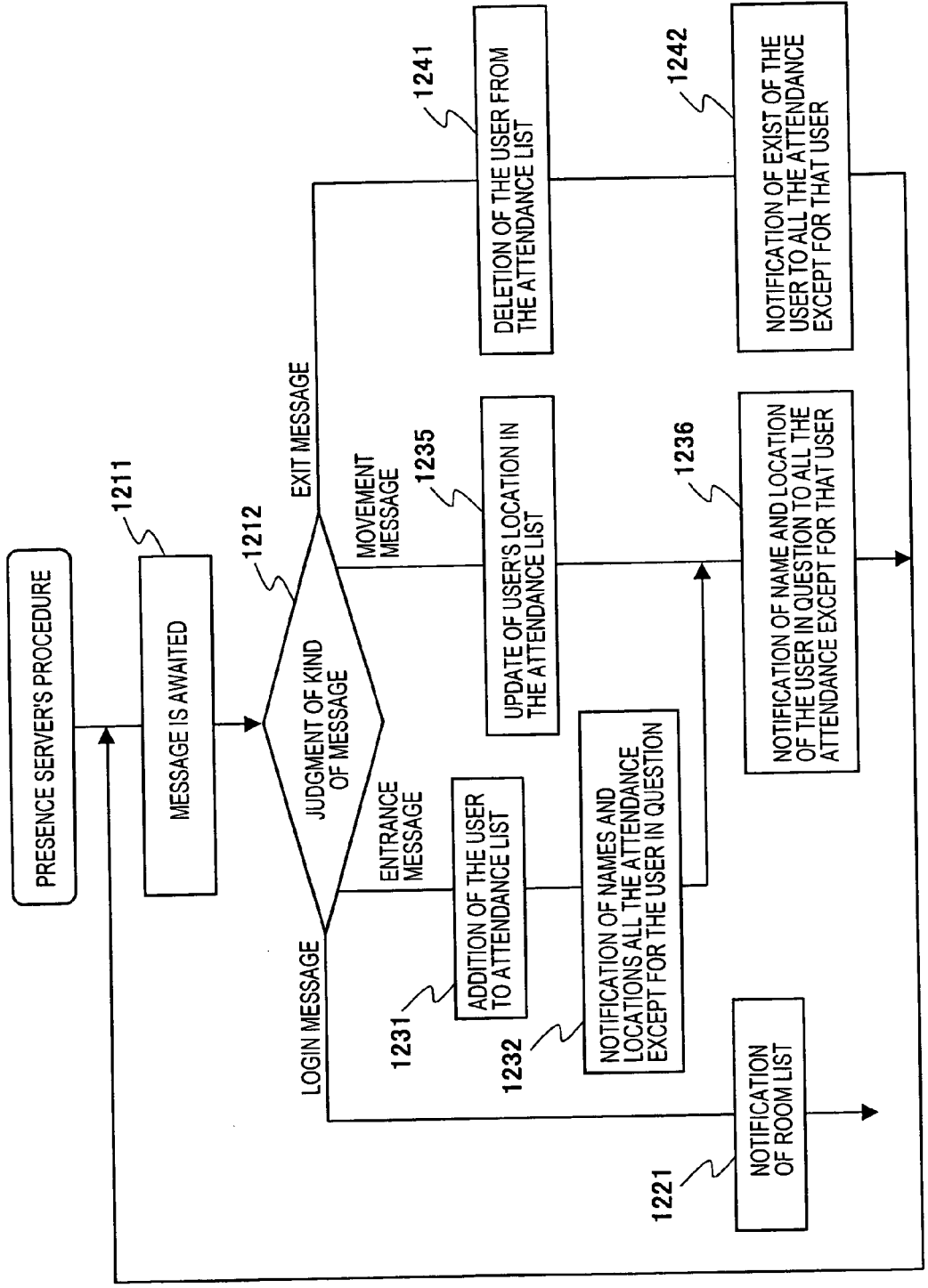
FIG. 12 is a flowchart showing a procedure of a presence server in an embodiment of the present invention.

FIG. 12 shows a procedure of the presence server 110. The presence server 110 receives requests from clients and performs processing of the requests, until the presence server 110 is stopped. First, in the step 1211, the interface unit 111 awaits a message from a client. When a message is received, then, in the step 112, the judgment unit 112 judges a kind of the message. When the message is a login message, the procedure goes to the step 1221, when the message is an entrance message to the step 1231, when the message is a movement message to the step 1235, and when the message is an exit message to the step 1241. In the case where the protocol of SIP is used, when the message is a SUBSCRIBE message, the judgment unit 112 judges it is a login message. When the message is a SUBSCRIBE message without an "Expires" header including 0 as a value for a specific room, the judgment unit 1212 judges the message as an entrance message. When the message is a NOTIFY message, the judgment unit 112 judges the message as a movement message. And, when the message is a SUBSCRIBE message with an "Expires" header including 0 as a value for a specific room, then the judgment unit 112 judges the message as an exit message.

In the case of a login message (the step 1221), the processing unit 113 of the presence server 110 instructs the interface unit 111 to send a room list to the client of the message source. The interface unit 111 sends the room list. Thereafter, the procedure returns to the step 1211, to await a next message. In the case where SIP is used, a NOTIFY message having the room list name (the address: rooms@servers.com) as the sender in the header and the room list as its contents is sent to the client. For example when the address of the user of the client in question is user1@servers.com, then, the message header becomes as follows.

NOTIFY user1@servers.com SIP/2.0
From: rooms@servers.com
To: user1@servers.com

In the case of the entrance message (the step 1231), the processing unit 113 adds the address of the user of the message source to the attendance list of the designated room, and determines the location of the user in the virtual space as the location in the positional information designated in the message. Next, in the step 1232, the processing unit 113 instructs the interface unit 111 to sends the addresses of all the attendance except for the user in question and the user's location to the client as the message source. According to the instruction, the interface unit 111 sends those pieces of information to the client as the message source. Then, the procedure goes to the step 1236 described below. In the case where SIP is used, a NOTIFY message including the addresses of all the attendance and the user location as its contents is sent. For example, when the user address is user1@servers.com and the designated room is room1@servers.com, then, a message having the following header is sent.

NOTIFY user1@servers.com SIP/2.0
From: room1@servers.com
To: user1@servers.com

In the case where, in the step 713 of the presence change output procedure (See FIG. 7), the protocol is set such that a SUBSCRIBE message is received, then, after the above NOTIFY message is sent in the step 1232, a SUBSCRIBE message designating the address of the user is sent to the user. For example, a message having the following header is sent.

SUBSCRIBE user1@servers.com SIP/2.0
From: room1@servers.com
To: user1@servers.com In the case of the movement message (the step 1235), the processing unit 113 updates the location of the user of the sending source client in the virtual space to the moved location received in the movement message, and updates the attendance list. Then, in the step 1236, the processing unit 113 instructs the interface unit 111 to notify the clients of all the attendance of the room in question except for the client of the user who has moved by the message, of the name and location of the user in question. According to the instruction, the interface unit 111 sends those pieces of information to the clients. This is same with the case of the entrance message (the step 1231). Then, the procedure returns to the step 1211. In the case where SIP is used, a NOTIFY message having the address (room1@servers.com) of the room in question as the sender and the address and location of the user in question as its contents is sent. When the address of a user as the destination is user2@servers.com, the message header becomes as follows.

NOTIFY user1@servers.com SIP/2.0
From: room1@servers.com
To: user2@servers.com

It is possible that traffic becomes enormous when NOTIFY messages are sent to all the attendance in the step 1236 each time the step 1235 is executed. To prevent this, it is considered that the processing unit 113 instructs the interface unit 111 not to send a NOTIFY message until a predetermined time elapses from the sending of the last NOTIFY message in the step 1235. In that case, in accordance with the instruction of the processing unit 113, the interface unit 111 collects information on movement messages received in a predetermined time, and sends a NOTIFY message having the collected information as its contents.

Further, in the case where a distance (stored in the storage unit 114) between a destination user of a NOTIFY message and the user who has given a movement message is smaller than a predetermined value in the virtual space (the case of a relatively short distance), then, the above-mentioned predetermined time may be set to a shorter time so that notifications are given frequently (high frequency of notification). On the other hand, in the case where the distance between those users is larger than a predetermined value (the case of a relatively long distance), the above-mentioned predetermined time may be set to a longer time so that the frequency of notifications are lowered (low frequency of notification). For example, in the case where the predetermined distance between the users in the virtual space is set to 10 m, then, when the distance to the destination user is 5 m, and the above-mentioned predetermined time is 0.2 second, movement messages are sent to the client in question at intervals of 0.2 second. On the other hand, when the distance to the destination user is 12 m, and the above-mentioned predetermined time is 1 second, then, movement messages are sent to the client in question at intervals of 1 second.

The sending interval or frequency is not limited to the two-stage control having longer and shorter distance stages with respect to a certain distance as described above. For example, the sending interval or frequency may be varied in proportion to the distance. Or, a plurality of thresholds of distance may be set and used for changing the sending interval or frequency, to control the sending interval or frequency based on the distance. Thus, fine sending control can be realized.

As a result, without preventing transmission of the status changes of the user in the neighborhood of users as the sending destinations, communication frequencies of users locating at long distances can be lowered to reduce traffic.

Further, the presence server 110 may previously collects from each client a part or all of the policy rules registered at the local policy 244 of that client, and holds the collected policy rules within the presence server 110. In that case, since the presence server 110 receives from each client a part or all of the policy rules registered at the local policy 244 of that client, the processing unit 113 can control communication based on not only distance but also importance of sending destination users described in the local policies 244. Namely, when users as sending destinations are important, then, a NOTIFY message can be sent to each client of those important users at the sending frequency or interval determined finely for that client.

In the case of the exit message (the step 1241), the processing unit 113 deletes the user from the attendance list. Next, in the step 1242, the processing unit 113 instructs the interface unit 111 to notify all the attendance, except for that user, of the exit of that user from the room. According to the instruction, the interface unit 111 sends the information to the clients. Then, the procedure returns to the step 1211 and awaits a message from a client. In the case where SIP is used, a NOTIFY message is sent. That NOTIFY message indicates the room in question as its sender, and has the contents including the name of the user exited the room and a message that the user in question was deleted. The message header is similar to the message header of the above step 1236.

Hereinabove, the present embodiment has been described.

According to the present embodiment, the presence server can grasp the locations of all the users who have entered a virtual space, and consistent virtual space property information and information on each user are distributed to all the users. As a result, the virtual space itself and each user's presence (i.e., an impression of his existence, or his location) can be made consistent between the users. Accordingly, users can have a natural conversation with one another, and smooth communication can be promoted. Further, among users who share a virtual space in their local policies, with respect to users important for grasping the situation and for promoting distribution of tacit knowledge, the policy is described such that high quality voice is sent and received to and from those important users even when those users are located at long distances. With respect to each of the other users, the policy is described such that lower quality voice is sent and received or connection is cut when such a user is located at a long distance. As a result, with respect to the important users, statuses of those users can be easily grasped, and distribution of tacit knowledge can be promoted among those users. On the other hand, with respect to the other users, an unnecessary waste of resources such as the network bandwidth can be avoided, and average traffic between clients can be reduced. In addition, resource consumption of a battery or a cell can be reduced.

Further, with respect to intimate users among users sharing a local policy virtual space, the policy is described such that clear voice is sent and received when such a user is located at a long distance. With respect to the other users, the policy is described such that, when such a user is located at a long distance, more unclear voice is sent, or a signal obtained by replacing voice with other sounds is sent and received, or connection is cut. As a result, possibility that a private conversation is heard by an unintimate user becomes lower, and privacy can be protected.

The present invention is not limited to the above embodiment, and can be variously changed within the scope of the invention. For example, three embodiments that are changed partly from the present embodiment will be described in the following.

First, in the above embodiment, the session control and session management are performed almost by the client 201, and the SIP proxy server 120 does not have intelligence. Further, audio and video communication is performed peer to peer without through a server. When multicast is employed, this method can suppress load on a network. However, in the case where the network 101 is a unicast network, this method increases load on the network. Further, in the case where many other users exist in the neighborhood of the user in question in the virtual space, processing load on the client increases, and the client may run into danger of impossibility of processing. The function of processing a plurality of audio or video signals separately may be transferred from each client to a server.

For example, to collect and bundle audio signals and video signals from clients, a dedicated communication server is connected to the network 101. The mentioned communication server bundles audio signals sent from clients to make one or a few RTP streams, and sends the RTP streams to each client. With respect to video signals also, one or few RTP streams are made and sent to each client. Although only bundling of audio signals or video signals can not suppress load on the network, the reduced number of connections can lessen the load on each client. Further, when the functions of the audio renderer 216 and the graphics renderer 219 are realized in the above-mentioned communication server, then, it is sufficient to send a stream including only one audio signal or one video signal to each client, thus suppressing the load on the network. To that end, however, it is necessary that the communication server receives information held by the space modeler 221 of each client from the presence server 110 successively. Further, it is necessary that the presence server 110 grasp the location of each user always at a high frequency.

In this configuration, instead of the communication request output procedure of FIG. 9, the client 201 makes a connection request to the above-mentioned communication server. Namely, when the new communication conditions are sent to the above-mentioned communication server, that communication server negotiates with the clients of the communication partners, determines an actual new communication conditions based on the present communication conditions and the designated new communication conditions, and sends an INVITE message including the new communication conditions or a BYE message to the client 201 as the request source and to all the clients as the communication partners. The mentioned INVITE message includes an SDP message designating the communication server as the communication partner. Accordingly, each client sends an audio signal or a video signal to the above-mentioned communication server.

Further, the client 201 is required for judging validity of a communication request from the communication server to another client, with respect to the communication request input procedure shown in FIG. 10. However, when a part or all of the local policy 244 is previously sent to the above-mentioned communication server, it is possible that the above-mentioned part or all of the communication request input procedure is performed on the side of the communication server, thus reducing the load on the client 201.

Secondly, in the embodiment described above, communication between the client 201 and the presence server 110 at the time of user movement uses an event notification type protocol represented by SUBSCRIBE-NOTIFY of SIP. However, instead of an event notification type protocol, a synchronization type protocol may be used. Namely, as in the case of sending and receiving a video signal or an audio signal, the location of the user in question and the locations of the other users can be sent and received periodically. In an environment where a user always or frequently moves and his movement should be promptly transmitted to the other users, overheads of the client 201 and the presence server 110 become smaller when a synchronization type protocol is used.

Thirdly, in the embodiment described above, the pointing device 226 is used to input a user's location or movement. However, it is possible that the space modeler 221 calculates a plurality of candidates for the location and shows the candidates on the display 220. Then, the user can select one out of the candidates using the pointing device 226 or other keys, to input the user's location. As the method of calculating candidates, there is a method in which, using the pointing device 226 or other keys, the user selects one or a plurality of partners he wishes to talk with out of the other users existing in the virtual space, and the space modeler 221 calculates the center of gravity in the figure formed in the virtual space by the above-mentioned partners, and several points around the location of the center of gravity are made the candidates. However, in this method, it is possible that users irrelevant to the conversation are included in the neighborhood of the location obtained by the above-mentioned calculation. This problem can be solved when a plurality of locations where a user irrelevant to the conversation does not exist are made the candidates. At that time, to realize the conversation, not only the user who inputs movement but also users with whom the user in question desires to have conversation should be advised to select their locations. Namely, locations calculated for the client of a user as a communication partner are sent to that client, and the client displays a menu including the present location and the sent locations as candidates, and the user as a communication partner should select one out of the candidates. Those locations determined by menu selection may be further changed using the pointing device 226.

What is claimed is:

1. A human communication system for realizing conversations between a plurality of users using a virtual space, wherein:

said human communication system comprises:

a server apparatus which manages respective locations of said plurality of users in said virtual space; and a plurality of client terminals used respectively by said plurality of users;

each of said plurality of client terminals comprises:

a client sending means which sends information on a location of a user himself of the client terminal in question to said server apparatus;

a client receiving means which receives information on respective locations of other users than the user of the client terminal in question from said server apparatus;

a space modeling means which calculates respective locations of said plurality of users based on said information on the user of the client terminal in question and said information on the locations of the other users; and a sound control means which controls sound effects applied to respective voices of said other users based on the locations calculated by said space modeling means; and said server apparatus comprises:

a server receiving means which receives, from each of said plurality of client terminals, the information on the location of the user of the client terminal in question;

a storage means which stores the respective locations of said plurality of users in the virtual space, based on the received information; and a server sending means which sends, to each of said plurality of client terminals, the information on the locations of the other users than the user of the client terminal in question.

2. The human communication system according to claim 1, wherein:

each of said plurality of client terminals further comprises an image generation means for generating image data to output on a display screen based on the locations calculated by said space modeling means.

3. The human communication system according to claim 1, wherein:
said sound control means controls said sound effects applied to respective voices of the other users, based on said respective locations of said plurality of users in the virtual space and property information of said virtual space.

4. The human communication system according to claim 2, wherein:
said image generation means generates the image data that arrange, in the virtual space, objects representing respectively said plurality of users and objects representing other structures, based on the locations of said plurality of users in the virtual space and the property information of said virtual space.

5. The human communication system according to claim 1, wherein:
said server apparatus further comprises a processing means which controls sending to said plurality of client terminals; and
said processing means controls a sending frequency or sending intervals of each terminal sending the information on the location of the user of the client terminal in question to the client terminals of the other users, based on distance between the user of the client terminal in question and each of the other users in the virtual space, and said distance is stored in said storage means.

6. The human communication system according to claim 5, wherein:
each of said plurality of client terminals further comprises a local policy storage means which stores communication conditions for controlling communication based on properties of a communication partner and a distance to said communication partner; and
said processing means of said server apparatus obtains the local policy storage means of each of said plurality of client terminals, and refers to said local policy storage means to determine the sending frequency or the sending intervals of sending, to each of said plurality of client terminals, the information on the respective locations of the other users.

7. The human communication system according to claim 1, wherein:
said server sending means sends, to each of said plurality of client terminals, an event request message for requesting sending of the information on the location of the user of the client terminal in question to said server apparatus; and
said event request message designates the sending frequency or the sending intervals in sending from the client terminal in question of said plurality of client terminals to said server apparatus; and
each of said plurality of client terminals sends the information on the location of the user of the client terminal in question to said server apparatus, according to said sending frequency or sending intervals sent from the server sending means.

8. A human communication system for realizing conversations between a plurality of users using a virtual space, wherein:
said human communication system comprises a plurality of client terminals used respectively by said plurality of users;

each of said plurality of client terminals comprises a policy session control means which controls a communication session and a local policy storage means for storing communication conditions;
when a user of a client terminal communicates with a client terminal of other user than the client terminal in question,
said policy session control means of the client terminal in question refers to the local policy storage means of the client terminal in question to judge whether the other user complies with the communication conditions, and, when the communication conditions are complied with, sends a communication request with designation of said communication conditions to policy session control means of the client terminal of the other users;
each of said policy session control means of the client terminal of the other user refers to the local policy storage means of the client terminal of that control means to judge whether said client terminal complies with the designated communication conditions, and when the conditions are complied with, sends a communication permission to said policy session control means that has sent the communication request, and when the conditions are not complied with, sends a communication rejection to said policy session control means that has sent the communication request.

9. The human communication system according to claim 8, wherein:
said policy session control means of the client terminal of the other user sends a communication permission added with communication conditions changed from said designated communication conditions to said policy session control means that has sent the communication request.

10. The human communication system according to claim 8, wherein:
each of said plurality of client terminals further comprises a space modeling means which holds information on a location of a user of the client terminal in question and locations of the other users; and
said policy session control means of the client terminal in question refers to the policy storage means of said client terminal, and, based on a distance between the user of the client terminal in question and each of the other users in the virtual space, disconnects communication with a client terminal of the user in question, or make said communication be lower quality communication.

11. The human communication system according to claim 8, wherein:
said communication uses at least either of voice and image;
each of said plurality of client terminals further comprises a space modeling means for holding information on a location of a user of the client terminal in question and locations of the other users; and
said policy session control means of the client terminal in question refers to the policy storage means of said client terminal, and, based on a distance between the user of the client terminal in question and each of the other users in the virtual space, obscures voice or an image used for communication with a client terminal of the user in question, or performs replacement processing on a part of the voice or the image to make the voice or the image inaudible or unreadable.

12. The human communication system according to claim 8, wherein:

said policy session control means refers to said local policy storage means, to change a bandwidth used for communication.

13. The human communication system according to claim 8, wherein:

each of said plurality of client terminals further comprises: a space modeling means which holds information on a location of a user of the client terminal in question and locations of the other users; and a power control means which controls power supply;

said policy session control means of the client terminal in question sends a predetermined signal to said power control means, based on a distance between the user of the client terminal in question and another user closest to said user in the virtual space, wherein said distance is received from the space modeling means; and said power control means lowers power consumption, when said predetermined signal is received.

14. A server apparatus in a human communication system using a virtual space for realizing conversations between a plurality of users using respectively a plurality of client terminals, said server apparatus comprising:

a server receiving means which receives, from each of said plurality of client terminals, the information on the location of the user of the client terminal in question;

a storage means which stores the respective locations of said plurality of users in the virtual space, based on the received information; and a server sending means which sends, to each of said plurality of client terminals, the information on the locations of the other users than the user of the client terminal in question.

15. The server apparatus according to claim 14, wherein:

said server apparatus further comprises a processing means which controls sending to said plurality of client terminals; and said processing means controls a sending frequency or sending intervals of each terminal sending the information on the location of the user of the client terminal in question to the client terminals of the other users, based on distance between the user of the client terminal in question and each of the other users in the virtual space, and said distance is stored in said storage means.

16. A human communication method using a virtual space for realizing conversation between a plurality of users, wherein:

each of plurality of client terminals used respectively by said plurality of users performs:

a step of sending information on a location of a user himself of the client terminal in question to a server apparatus that manages respective locations of said plurality of users in said virtual space;

a step of receiving information on respective locations of other users than the user of the client terminal in question from said server apparatus;

a step of calculating respective locations of said plurality of users based on said information on the user of the client terminal in question and said information on the locations of the other users; and a step of controlling sound effects applied to respective voices of said other users based on said calculated locations.

17. The human communication method according to claim 16, wherein:

each of said plurality of client terminals used respectively by said plurality of users performs:

a step of generating image data to output on a display screen, based on said locations calculated by said space modeling means.

18. A human communication method using a virtual space for realizing conversations between a plurality of users, wherein:

each of a plurality of client terminals used respectively by said plurality of users performs a following step, when a user of the client terminal in question communicates with other client terminal used by other users than said user; namely, a step of referring to a local policy of said client terminal in question, with said local policy storing communication conditions of said client terminal, judging whether the other user comply with said communication conditions, and when the communication conditions are complied with, sending a communication request designating said communication conditions to the other client terminal of the other user; and said client terminal that receives said communication request performs:

a step of referring to a local policy storing communication conditions of the client terminal in question, judging whether said communication conditions designated are complied with, and when said designated communication conditions are complied with, sending a communication permission to said client terminal that has sent said communication request, and when said designated communication conditions are not complied with, sending a communication rejection to said client terminal that has sent said communication request.

* * * * *